United States Patent
Ogasawara et al.

(10) Patent No.: US 9,374,622 B2
(45) Date of Patent: Jun. 21, 2016

(54) DISPLAY DEVICE AND METHOD FOR CONTROLLING DISPLAY DEVICE TO SELECTIVELY DISPLAY IMAGES WITH CONTENT

(71) Applicant: SHARP KABUSHIKI KAISHA, Osaka-shi, Osaka (JP)

(72) Inventors: Yoshiyasu Ogasawara, Osaka (JP); Masahiro Tai, Osaka (JP); Kazunori Yoshizawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/394,515

(22) PCT Filed: Mar. 22, 2013

(86) PCT No.: PCT/JP2013/058339
§ 371 (c)(1),
(2) Date: Oct. 15, 2014

(87) PCT Pub. No.: WO2013/157349
PCT Pub. Date: Oct. 24, 2013

(65) Prior Publication Data
US 2015/0082350 A1    Mar. 19, 2015

(30) Foreign Application Priority Data

Apr. 17, 2012 (JP) ................................. 2012-094254
Mar. 21, 2013 (JP) ................................. 2013-059158

(51) Int. Cl.
*H04N 5/445* (2011.01)
*H04N 21/482* (2011.01)
(Continued)

(52) U.S. Cl.
CPC ........... *H04N 21/482* (2013.01); *H04N 21/251* (2013.01); *H04N 21/4314* (2013.01); *H04N 21/4516* (2013.01); *H04N 21/4524* (2013.01); *H04N 21/4532* (2013.01); *H04N 21/4826* (2013.01); *H04N 21/4828* (2013.01)

(58) Field of Classification Search
CPC ............ H04N 21/482; H04N 21/4532; H04N 21/4828; H04N 21/4314; H04N 21/251; H04N 21/4826; H04N 21/4524; H04N 21/4516
USPC .............................. 725/14, 39–46, 51, 53, 61
See application file for complete search history.

(56) References Cited

U.S. PATENT DOCUMENTS

| | | | | |
|---|---|---|---|---|
| 7,765,569 B2 * | 7/2010 | MacBeth | ........... | H04N 5/44543 725/39 |
| 8,151,215 B2 * | 4/2012 | Baurmann | ......... | H04N 5/44543 715/835 |

(Continued)

FOREIGN PATENT DOCUMENTS

JP    2008-288731 A    11/2008
JP    2010-98452 A    4/2010

*Primary Examiner* — Hoang-Vu A Nguyen-Ba
(74) *Attorney, Agent, or Firm* — Birch, Stewart, Kolasch & Birch, LLP

(57) ABSTRACT

The present invention includes (i) a tuner (21b) for preferentially receiving broadcast waves (2b) for carrying television programs (3b) list-displayed near a television program (3a) carried by a broadcast wave (2a) rather than a broadcast wave for carrying television programs which are list-displayed away from the television program (3a) and (ii) an information obtaining section (11) for obtaining thumbnails (5a) representing the television programs (3b) from the broadcast waves (2b) received by the tuner (21b).

13 Claims, 12 Drawing Sheets

(51) Int. Cl.
*H04N 21/25* (2011.01)
*H04N 21/45* (2011.01)
*H04N 21/431* (2011.01)
*G06F 3/00* (2006.01)
*G06F 13/00* (2006.01)

(56) References Cited

U.S. PATENT DOCUMENTS

| | | | | |
|---|---|---|---|---|
| 8,640,166 B1* | 1/2014 | Craner | ............... | H04N 21/4826 725/37 |
| 8,739,218 B2* | 5/2014 | Gordon | ............. | H04N 5/44543 715/768 |
| 2004/0221307 A1* | 11/2004 | Arai | ..................... | H04H 60/72 725/44 |
| 2006/0282852 A1* | 12/2006 | Purpura | ............. | H04N 5/44543 725/39 |
| 2007/0107015 A1* | 5/2007 | Kazama | ............. | G06F 3/04815 725/58 |
| 2007/0204298 A1* | 8/2007 | Shanks | .................. | H04H 60/31 725/43 |
| 2007/0220546 A1* | 9/2007 | Shanks | ............... | H04N 5/44591 725/38 |
| 2008/0062318 A1* | 3/2008 | Ellis | ................... | H04N 5/44543 348/564 |
| 2010/0083316 A1* | 4/2010 | Togashi | ............. | H04N 5/44543 725/41 |
| 2010/0095327 A1 | 4/2010 | Fujinaka et al. | | |
| 2011/0083148 A1* | 4/2011 | Sakaguchi | ......... | H04N 5/44543 725/39 |
| 2011/0321095 A1* | 12/2011 | Yao | ..................... | H04N 21/235 725/41 |
| 2012/0079430 A1* | 3/2012 | Kwahk | ................. | G06F 3/0488 715/834 |
| 2012/0167136 A1* | 6/2012 | Yuen | .................... | H04N 5/44543 725/36 |
| 2014/0289772 A1* | 9/2014 | Feldstein | ........... | H04N 5/44543 725/41 |

* cited by examiner

DISPLAY DEVICE AND METHOD FOR CONTROLLING DISPLAY DEVICE TO SELECTIVELY DISPLAY IMAGES WITH CONTENT

TECHNICAL FIELD

The present invention relates to a display device and the like which can display a content that has been carried by a broadcast wave broadcasted from an external broadcasting station.

BACKGROUND ART

An electronic program guide (EPG) is a system in which a device (such as a television receiver), which outputs an externally received content to its display section, displays information relating to the content. The information is carried while being superimposed on a digital broadcast wave broadcasted from each broadcasting station, and therefore the device can provide the information to a user in real time.

In recent years, devices such as a television and a recorder are generally available which enable the user to select an intended content from a contents listing (in particular, a so-called "counterprogram listing" in a case where the content is a television program), which has been generated by utilizing the EPG, for causing the content to be displayed or making a recording instruction. In view of improvement in usability, therefore, it is important to display the contents listing such that the user can easily view the contents listing.

By taking into consideration the importance, efforts have been widely made for improving the display of the contents listing. For example, Patent Literature 1 discloses a display processing device with which a user can easily confirm and select any of programs of a plurality of favorite channels. Patent Literature 2 discloses a television receiving device which displays a counterprogram listing, which includes thumbnail images extracted based on faces, of currently broadcasted counterprograms.

CITATION LIST

Patent Literature

[Patent Literature 1]
Japanese Patent Application Publication Tokukai No. 2008-288731 (Publication date: Nov. 27, 2008)
[Patent Literature 2]
Japanese Patent Application Publication Tokukai No. 2010-098452 (Publication date: Apr. 30, 2010)

SUMMARY OF INVENTION

Technical Problem

For example, in a case where the television receiver displays a counterprogram listing by utilizing the EPG, it is considered that the usability will be greatly improved if thumbnails (i.e., images) indicative of contents of the respective counterprograms can be displayed together with pieces of information of the respective counterprograms.

However, there are two problems in obtaining such thumbnails. The first problem is that it takes some time to obtain a thumbnail of a television program from a broadcast wave. That is, it generally takes approximately 10 seconds per broadcasting station, and accordingly it takes several minutes to several tens of minutes to obtain images from all broadcasting stations (the number of which is assumed to be 20 to 40) from which the television receiver can receive broadcast waves.

As such, according to the conventional television receiver, it takes long time from when an instruction is given by the user on displaying a counterprogram listing to when the counterprogram listing including thumbnails is displayed. In view of usability, it is not preferable to make the user wait for such a long time, and therefore a technique may be employed in which, for example, a counterprogram listing which does not include thumbnails is displayed first, and then obtained thumbnails are displayed sequentially. However, such a technique is not a fundamental solution and cannot satisfy needs of users who wish to immediately view thumbnails of counterprograms on a counterprogram listing.

The second problem is that a content of a counterprogram represented by a thumbnail, which has been obtained over time, is not synchronized with a content of a counterprogram which is currently broadcasted. That is, in a case where the broadcasting of the program is ended and then another program starts to be broadcasted while the thumbnail is obtained over time, the content of the program represented by the obtained thumbnail does not conform to a content of that another program whose broadcasting has been newly started. This may undermine the originally intended function that the user can view a list of contents of currently broadcasted counterprograms by merely viewing a displayed counterprogram listing.

Note that the conventional techniques disclosed in Patent Literatures 1 and 2 cannot solve the above described problems. This is because Patent Literatures 1 and 2 do not relate to a technique to quickly obtain images.

The present invention is accomplished in view of the problems, and its object is to provide a display device and the like which can improve user-friendliness by preferentially obtaining images that are presumed to greatly influence usability.

Solution to Problem

In order to attain the object, a display device in accordance with an aspect of the present invention includes:
(1) first receiving means for receiving a broadcast wave broadcasted from an external broadcasting station, the display device list-displaying a content which has been carried by the broadcast wave received by the first receiving means;
(2) second receiving means for preferentially receiving first broadcast waves for carrying first contents, which are list-displayed near the content carried by the broadcast wave, rather than second broadcast waves for carrying second contents which are list-displayed away from the content carried by the broadcast wave; and
(3) obtaining means for obtaining, from the first broadcast waves received by the second receiving means, images which represent the respective first contents.

In order to attain the object, a method for controlling the display device in accordance with an aspect of the present invention includes the steps of:
(1) receiving a broadcast wave broadcasted from an external broadcasting station, the display device list-displaying a content which has been carried by the broadcast wave;
(2) preferentially receiving first broadcast waves for carrying first contents, which are list-displayed near the content carried by the broadcast wave, rather than second broadcast waves for carrying second contents which are list-displayed away from the content carried by the broadcast wave; and (3) obtaining, from the first broadcast waves received in the step (2), images which represent the respective first contents.

Advantageous Effects of Invention

According to an aspect of the present invention, the display device and the method for controlling the device can preferentially obtain images that are presumed to greatly influence the usability. Therefore, the display device and the like bring about an effect of improving user-friendliness.

DESCRIPTION OF EMBODIMENTS

Figure 1:
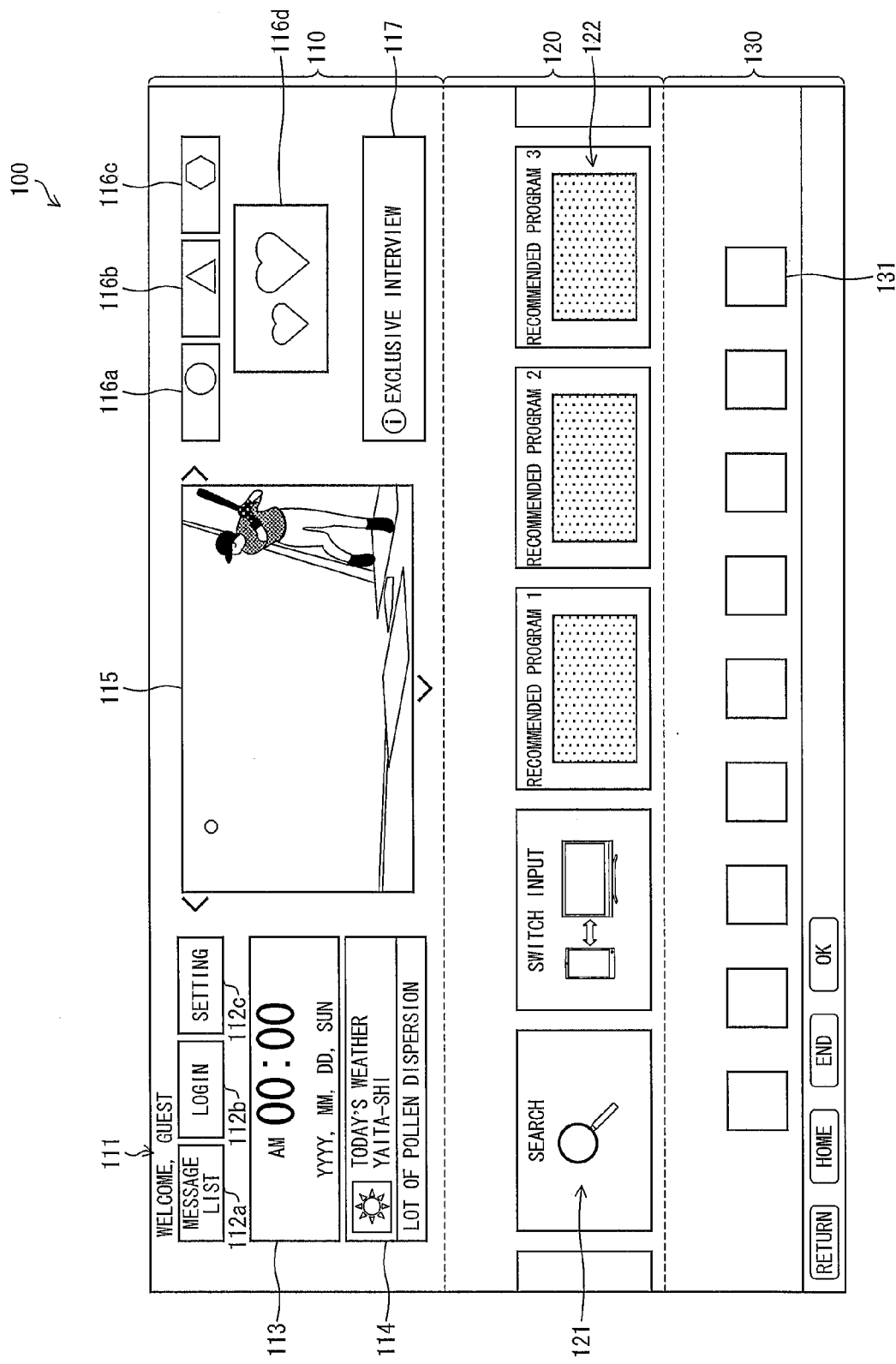
FIG. 1 is a view illustrating an example configuration of a menu screen which is displayed on a display of a television, in accordance with an embodiment of the present invention.

The following description will discuss an embodiment of the present invention in detail, with reference to FIGS. 1 through 12.

In the descriptions below, symbols "a" and "b" are added to an identical reference numeral for a certain element in order to explicitly indicate that a plurality of certain elements exist (e.g., "broadcast wave 2a" and "broadcast wave 2b"). Moreover, by omitting such symbols "a" and "b" added to the reference numeral, the certain elements are collectively referred to. For example, the broadcast wave 2a and the broadcast wave 2b are sometimes collectively referred to as "broadcast wave 2".

Further, in order to explicitly indicate that a certain element relates to another element, an identical reference numeral is given to the certain element and the another element, and further symbols "a" and "b" are given to the certain element and the another element, respectively (e.g., "thumbnail 5a" and "program information 5b").

[Menu Screen]

The following description will discuss a menu screen 100 which is displayed on a display (i.e., a display screen 72; see FIG. 4) of a television receiver (hereinafter, simply referred to as "television") 1, with reference to FIG. 1. FIG. 1 is a view illustrating an example configuration of the menu screen 100 which is displayed on the display of the television 1.

When a user presses a predetermined button (hereinafter, referred to as "home button") provided on a remote controller, the television 1 displays the menu screen 100. As illustrated in FIG. 1, the menu screen 100 has an information zone 110, a function and recommend zone 120, and an Internet service zone 130.

The following description will discuss the information zone 110, the function and recommend zone 120, and the Internet service zone 130 in this order.

(Information Zone)

In the information zone 110 of the television 1, various kinds of information are displayed, and the information zone 110 can be paraphrased as "information display area". The information zone 110 includes a user name display area 111, a message list button 112a, a login button 112b, a setting button 112c, a time display area 113, a weather display area 114, a live picture display area 115, banners 116a through 116c, a banner detail display area 116d, and an information display area 117.

The user name display area 111 in the television 1 is an area for displaying a user name. The television 1 has a function to login a predetermined server (hereinafter, referred to as "manufacturer server") which is provided by a manufacturer or the like of the television 1. When the television 1 has logged in the manufacturer server, the television 1 displays the user name, which has been used in the login, in the user name display area 111. Note that, until the login is completed, the television 1 displays, in the user name display area 111, a character string (in FIG. 1, "Welcome, guest") for indicating a logout state.

The message list button 112a is provided to call up a message list screen. When an OK button of a remote controller is pressed while the message list button 112a is being focused, the menu screen 100 displayed on the television 1 is changed to the message list screen. Note that the message list button 112a can be focused only in a case where the television 1 is connected with a network.

The login button 112b is provided to call up a login screen. When the user presses the OK button of the remote controller while the login button 112b is being focused, the menu screen 100 displayed on the television 1 is changed to the login screen. Note that the login button 112b can be focused only in a case where the television 1 is connected with a network.

The setting button 112c is provided to call up a setting screen. When the user presses the OK button of the remote controller while the setting button 112c is being focused, the menu screen 100 displayed on the television 1 is changed to the setting screen. Note that the setting button 112c can be focused regardless of whether or not the television 1 is connected with a network.

In the time display area 113 of the television 1, a current time is displayed. The current time can be displayed in an arbitrary manner in the time display area 113. In the present embodiment, the current time is displayed in a format "AM :/YYYY, MM, DD, Day of the week" ("/" indicates a line feed). Note that the television 1 can obtain the current time, which is displayed in the time display area 113, from, for example, a clock provided in the television, SI information in a broadcast wave, or an NTP server connected with the television.

In the weather display area 114 of the television 1, weather information of a region in which the television 1 is provided is displayed. The weather information can be displayed in an arbitrary manner in the weather display area 114. In the present embodiment, the weather information is displayed in a format which contains a weather icon (in an example illustrated in FIG. 1, an icon indicating "fair, later, cloudy"), a region name (in the example illustrated in FIG. 1, "Yaitashi"), and a comment (in the example illustrated in FIG. 1, "a large amount of pollen dispersion is predicted in the north of Kanto region"). Note that the weather information, which is to be displayed in the weather display area 114, can be obtained by the television 1 from a manufacturer server or the like or can be extracted by the television 1 from a data broadcast.

In the live picture display area 115 of the television 1, a picture (moving image or still image), which was displayed on the entire screen immediately before being changed to the menu screen 100, is displayed while being scaled-down. For example, in a case where a certain broadcast program was displayed on the entire screen immediately before being changed to the menu screen 100, the broadcast program is scaled-down and continuously displayed in the live picture display area 115. Alternatively, in a case where a certain web page was displayed on the entire screen immediately before being changed to the menu screen 100, the web page is continuously displayed in the live picture display area 115.

Note that the live picture display area 115 can be focused regardless of whether or not the television 1 is connected with a network. When the user presses the OK button of the remote controller while the live picture display area 115 is being focused, the television 1 stops displaying the menu screen 100 and resumes displaying a live picture on the entire screen.

The banners 116a through 116c are banners provided from the manufacturer server and are, for example, banner advertisements provided from the manufacturer server. The banners 116a through 116c can be focused regardless of whether or not the television 1 is connected with a network. In the banner detail display area 116d, detailed information corresponding to a focused banner is displayed. The banners 116a through 116c and pieces of detailed information corresponding to the respective banners 116a through 116c are downloaded from the manufacturer server while the television 1 is connected to the network and are then stored in the television 1.

In the information display area 117 of the television 1, an arbitrary character string is displayed which has been supplied from the manufacturer server. The character string displayed in the information display area 117 goes from a right end to a left end of the information display area 117. When a last character goes out from the left end of the information display area 117, a first character comes in from the right end of the information display area 117.

Note that, in the description below, UI (User Interface) components which can be focused out of UI components included in the information zone 110 are collectively referred to as "menu item". Specifically, the message list button 112a, the login button 112b, the setting button 112c, the live picture display area 115, and the banners 116a through 116c fall under the menu item.

(Function and Recommend Zone)

In the function and recommend zone 120 of the television 1, panels (hereinafter, referred to as "function panel") 121 corresponding to respective functions and panels (hereinafter, referred to as "recommended content panel") 122 corresponding to respective recommended contents are displayed. The function and recommend zone 120 can be paraphrased as a panel display area. The function panels 121 and the recommended content panels 122 are aligned side by side in a row in the function and recommend zone 120.

The function panels 121 correspond to respective of a plurality of functions of the television 1. When the user presses the OK button of the remote controller while one of the function panels 121 is focused, the menu screen 100 displayed on the television 1 is changed to a screen for using a function that corresponds to the selected function panel 121.

According to the present embodiment, the function panels 121 are a counterprogram panel, a smart search panel, a recorded video list panel, an input switching panel, a program listing panel, and a calendar panel. For example, when the user presses the OK button of the remote controller while the counterprogram panel is being focused, the menu screen 100 displayed on the television 1 is changed to a display screen (also referred to as "counterprogram selection screen", see FIG. 3) for displaying a counterprogram listing 8. Alternatively, when the user presses the OK button of the remote controller while the smart search panel is being focused, the menu screen 100 displayed on the television 1 is changed to a smart search screen.

The recommended content panels 122 correspond to respective of a plurality of recommended contents (a counterprogram, a program which has not been broadcasted yet, a recorded program, or a web page) which have been selected by the television 1. When the user presses the OK button of the remote controller while a certain recommended content panel 122 is being focused, the television 1 (i) starts to display a corresponding recommended content on the entire screen (in a case where the recommended content is a counterprogram, a recorded program, or a web page) or (ii) starts to display, on the entire screen, a recording program screen for programming to record a corresponding recommended content (in a case where the recommended content is a program which has not been broadcasted yet).

Note that, in the description below, UI components which can be focused out of UI components included in the function and recommend zone 120 are collectively referred to as "menu item". Specifically, the function panels 121 and the recommended content panels 122 fall under the menu item.

(Internet Service Zone)

In the Internet service zone 130 of the television 1, icons 131 corresponding to respective Internet services are displayed. When the user presses the OK button of the remote controller while a certain icon is being focused, the menu screen 100 displayed on the television 1 is changed to a screen for using an Internet service corresponding to the certain icon 131.

According to the present embodiment, the icons 131 are an IPTV icon, a photograph and magazine icon, a shopping icon, a search and TV portal icon, an Internet video icon, a communication icon, a life support icon, a service list icon, and a bookmark icon.

Note that the icons 131 which correspond to the respective Internet services are displayed only while the television 1 is connected with the network. In a case where the television 1 is not connected with the network, a message indicating the state of being not connected with the network, a button for calling up a video content for prompting network connection, a button for calling up a network setting screen, and the like can be displayed in the Internet service zone 130.

Note that, in the description below, UI components which can be focused out of UI components included in the Internet service zone 130 are collectively referred to as "menu item". Specifically, the icons 131 fall under the menu item.

[Screen Transition]

Figure 2:
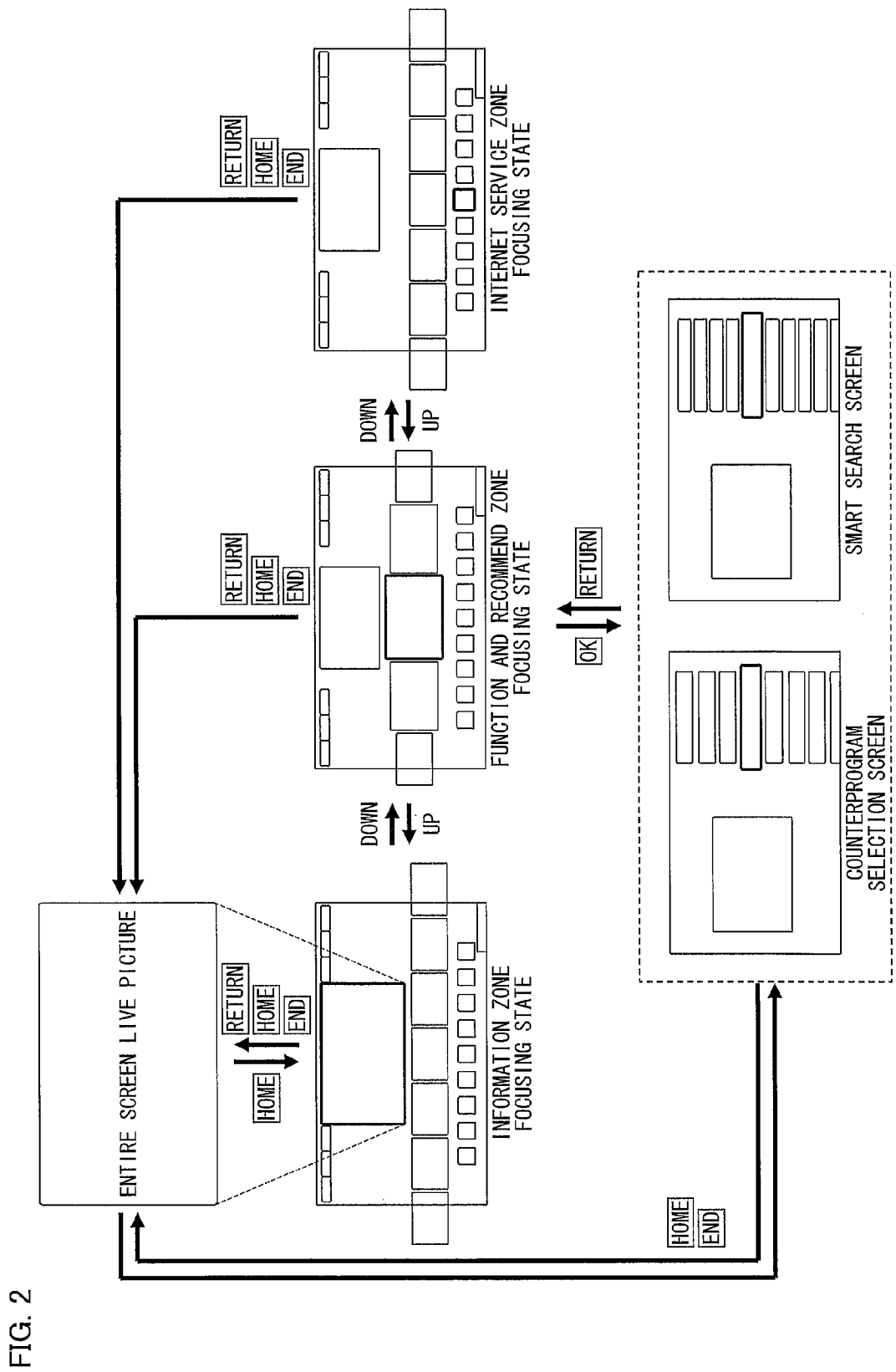
FIG. 2 is a screen transition diagram illustrating a screen transition on the television.

The following description will discuss a screen transition of the television 1, with reference to FIG. 2. FIG. 2 is a screen transition diagram illustrating a screen transition of the television 1.

When the user presses the home button of the remote controller while a live picture such as a broadcast program is displayed on the entire screen, the live picture displayed on the entire screen of the television 1 is changed to the menu screen 100 (see FIG. 2).

States of the menu screen 100 are classified roughly into an information zone focusing state, a function and recommend zone focusing state, and an Internet service zone focusing state. In the information zone focusing state, any one of the menu items contained in the information zone 110 is focused. In the function and recommend zone focusing state, any one of the menu items contained in the function and recommend zone 120 is focused. In the Internet service zone focusing state, any one of the menu items contained in the Internet service zone 130 is focused. In any of the states, a focused menu item is distinguishable from the other menu items by a focusing frame surrounding the focused menu item.

When the user presses a right button of the remote controller in the information zone focusing state, a menu item to be focused in the television 1 is changed from a currently focused menu item to a menu item which is located on the immediate right of the currently focused menu item. Similarly, when the user presses a left button of the remote controller in the information zone focusing state, a menu item to be focused in the television 1 is changed from a currently focused menu item to a menu item which is located on the immediate left of the currently focused menu item. Note that the move of focus in the information zone focusing state is carried out not by moving locations of the menu items but by moving a location of the focusing frame.

When the user presses a down button of the remote controller in the information zone focusing state, the information zone focusing state of the menu screen 100 on the television 1 is changed to the function and recommend zone focusing state (see FIG. 2). Contrary to this, when the user presses an up button of the remote controller in the function and recommend zone focusing state, the function and recommend zone focusing state of the menu screen 100 on the television 1 is changed to the information zone focusing state.

When the user presses the right button of the remote controller in the function and recommend zone focusing state, a menu item to be focused in the television 1 is changed from a currently focused menu item to a menu item which is located on the immediate right of the currently focused menu item. Similarly, when the user presses the left button of the remote controller in the function and recommend zone focusing state, a menu item to be focused in the television 1 is changed from a currently focused menu item to a menu item which is located on the immediate left of the currently focused menu item. Note that the move of focus in the function and recommend zone focusing state is carried out not by moving a location of the focusing frame but by moving locations of the menu items.

When the user presses the down button of the remote controller in the function and recommend zone focusing state, the function and recommend zone focusing state of the menu screen 100 on the television 1 is changed to the Internet service zone focusing state (see FIG. 2). Contrary to this, when the user presses the up button of the remote controller in the Internet service zone focusing state, the Internet service zone focusing state of the menu screen 100 on the television 1 is changed to the function and recommend zone focusing state.

When the user presses the right button of the remote controller in the Internet service zone focusing state, a menu item to be focused in the television 1 is changed from a currently focused menu item to a menu item which is located on the immediate right of the currently focused menu item. Similarly, when the user presses the left button of the remote controller in the Internet service zone focusing state, a menu item to be focused in the television 1 is changed from a currently focused menu item to a menu item which is located on the immediate left of the currently focused menu item. The move of focus in the Internet service zone focusing state is carried out not by moving locations of the menu items but by moving a location of the focusing frame.

Note that, when the user presses a return button, the home button, or an end button of the remote controller while the menu screen 100 is displayed, the television 1 terminates the display of the menu screen 100 and resumes displaying a live picture on the entire screen.

When the user presses the OK button of the remote controller while any of the function panels 121 is being focused, the menu screen 100 displayed on the television 1 is changed to a screen for using a function that corresponds to the selected function panel 121.

For example, when the user presses the OK button of the remote controller while the counterprogram panel is being focused, the menu screen 100 displayed on the television 1 is changed to a screen to display the counterprogram listing 8. Alternatively, when the user presses the OK button of the remote controller while the smart search panel is being focused, the menu screen 100 displayed on the television 1 is changed to the smart search screen.

When the user presses the return button of the remote controller while a screen such as the counterprogram selection screen or the smart search screen is displayed, the screen displayed on the television 1 is changed to the menu screen 100. Alternatively, when the user presses the return button of the remote controller while a screen such as the counterprogram selection screen or the smart search screen is displayed, the television 1 terminates the display of the screen and resumes displaying a live picture on the entire screen.

Note that the focusing frame displayed around a focused menu item preferably blinks. A blinking cycle of the focusing frame can be set to, for example, 0.5 Hz. With the configuration, even in a case where the menu items are colorful, the user can easily recognize which menu item is focused.

Note, however, that, if the focusing frame is moved in a dark state, it is difficult for the user to recognize the move of the focusing frame. In order to avoid such a problem, the present embodiment employs a configuration in which a state of the focusing frame is reset to a bright state every time the focusing frame is moved. The focusing frame can have an arbitrary color, and the focusing frame of the present embodiment is colored in yellow so that viewability is improved in a case where a background color is black.

[Overview of Screen for Displaying Counterprogram Listing]

Figure 3:
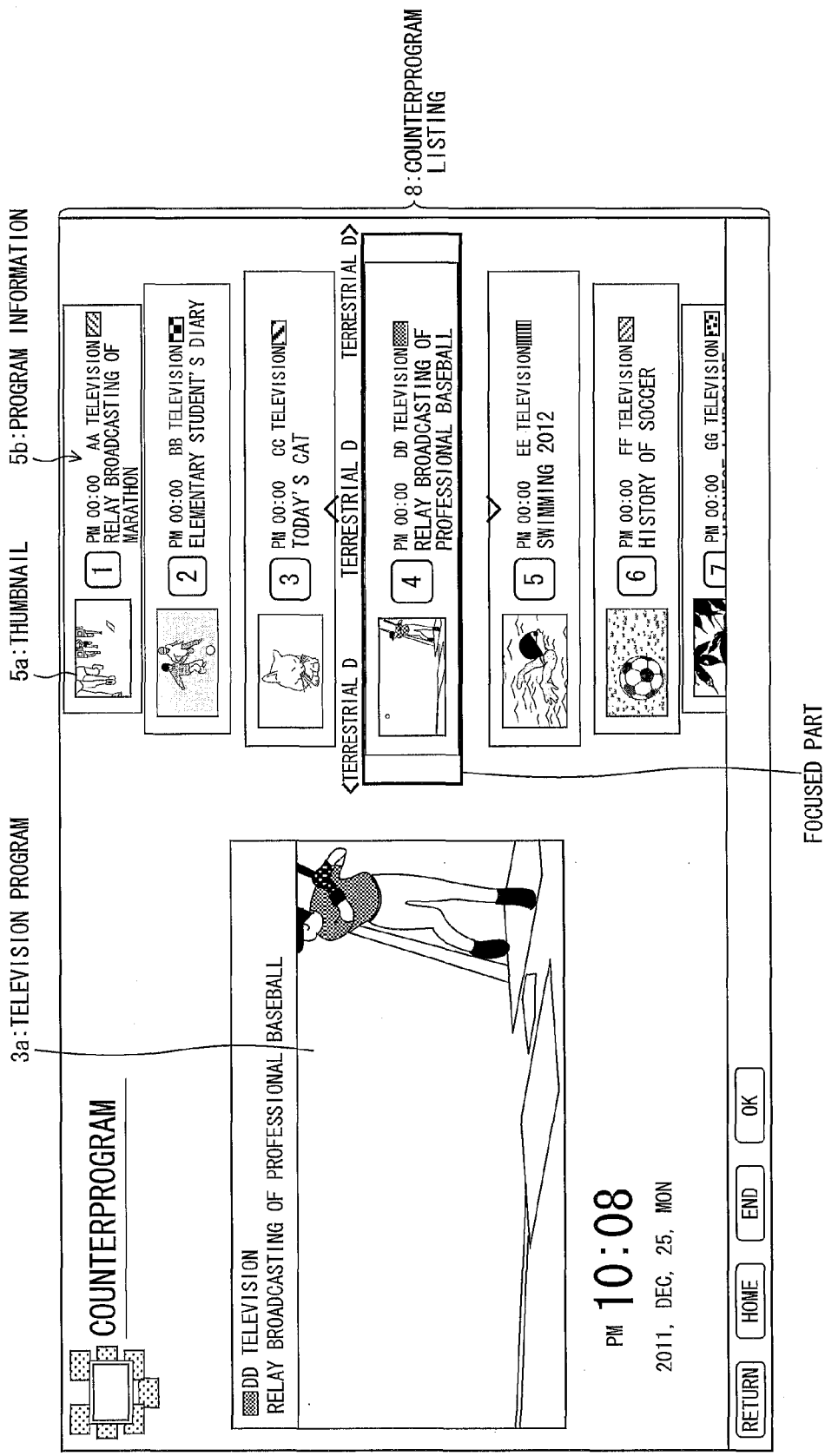
FIG. 3 is a view illustrating an example configuration of a counterprogram listing screen displayed on the display of the television receiver.

The following description will schematically discuss a screen of the television 1 for displaying the counterprogram listing 8, with reference to FIG. 3. FIG. 3 is a view illustrating an example screen configuration of the counterprogram listing 8 displayed on the display of the television 1. The television 1 displays the counterprogram listing 8 as illustrated in FIG. 3.

The television 1 displays a television program 3*a*, which is currently viewed by the user, in a left part of the screen. Moreover, the television 1 displays, in a right part of the screen, the counterprogram listing 8 which contains, in a predetermined form, pieces of program information 5*b* and thumbnails 5*a* of respective of other television programs (first content) 3*b* (so-called "counterprogram", see FIG. 4) which are broadcasted at the same time as the television program 3*a*.

Note that the "predetermined form" can be, for example, a list form in which television programs 3*b*, each of which is indicated by a thumbnail 5*a* and program information 5*b*, are aligned in one line in an ascending order (or a descending order) of channel numbers of the broadcasting stations or service identifications (service ID). Alternatively, the "predetermined form" can be, for example, a table form in which a thumbnail 5*a* and program information 5*b* are associated with a first item (such as broadcasting time) value and a second item (such as broadcasting station) value, and the thumbnail 5*a* and the program information 5*b* are arranged in an intersection of a row of the first item value and a column of the second item value.

This allows the television 1 to display broadcasting stations (near broadcasting stations), whose channel numbers or service identifications are close to each other, such that the broadcasting stations are located near each other. Note that the displays in the list form and the table form are merely examples, and the "predetermined form" is not limited to a particular one, provided that contents are displayed so as to be viewed at a glance.

Here, the thumbnail (image) 5*a* is an image that indicates a content of a television program 3*b* that can be obtained from other broadcast wave 2*b* received by a tuner section 21*b*.

The program information (content identification information) 5*b* is information that contains information based on which a content can be identified. The program information 5*b* contains various kinds of data which are obtained via, for example, an electronic program guide (EPG) or the Internet.

As illustrated in FIG. 3, the television 1 can display the counterprogram listing 8 that contains thumbnails 5*a* of respective television programs 3*b*. Note that the television 1 starts to display the counterprogram listing in a state where a cursor is on a broadcasting station that is broadcasting the television program 3*a* currently viewed by the user (i.e., in a state where the broadcasting station broadcasting the television program 3*a* can be selected first) (note that the "cursor" indicates a rectangle that clearly indicates that the broadcasting station is being selected. Moreover, an area around the cursor, which is superimposed on the program information 5*b*, is referred to as "focused part").

That is, as above described, when the user presses the OK button of the remote controller while the counterprogram panel is being focused, the menu screen 100 displayed on the display of the television 1 is changed to the screen for displaying the counterprogram listing 8 (see FIG. 2), and immediately after that, the television 1 displays the counterprogram listing 8 in a state where the cursor is on a broadcasting station (i.e., the broadcasting station is focused) that is broadcasting a television program 3*a* currently viewed by the user.

The television 1 preferentially obtains thumbnails 5*a* indicating respective television programs 3*b* which are list-displayed near the television program 3*a* that is currently viewed by the user. Therefore, the television 1 can appropriately display the thumbnails 5*a* even immediately after the screen displayed on the television 1 has been changed to the screen for displaying the counterprogram listing 8.

In a case where the user has changed the focused part by operating the remote controller (i.e., changes the broadcasting station on which the cursor is superimposed) so as to designate an intended broadcasting station (i.e., in a case where the broadcasting station has been selected by user operation), the television 1 preferentially obtains thumbnails 5*a* indicating respective television programs 3*b* which are list-displayed near a television program 3 which is carried by a broadcast wave broadcasted from the selected broadcasting station. Therefore, the television 1 can display thumbnails 5*a* while following the change of the focused part.

As above described, according to the conventional television receiver, it takes time to obtain a thumbnail of a television program from a broadcast wave, and therefore it takes long time from when an instruction is given by the user on displaying a counterprogram listing to when the counterprogram listing including thumbnails is displayed.

In view of usability, it is not preferable to make the user wait for such a long time, and therefore the conventional television receiver has employed the technique in which, for example, a counterprogram listing which does not include thumbnails is displayed first, and then obtained thumbnails are displayed sequentially. However, such a conventional technique cannot satisfy needs of users who wish to immediately view thumbnails of other television programs (i.e., counterprograms) on the counterprogram listing.

In view of this, the television 1 of the present embodiment preferentially obtains thumbnails 5*a* of respective television programs 3*b* that are broadcasted from broadcasting stations, which are near the broadcasting station broadcasting the television program 3*a* that is currently viewed by the user. As such, the television 1 can preferentially obtain thumbnails 5*a* which are presumed to be highly necessary for displaying the counterprogram listing 8 (i.e., preferentially obtain images which are presumed to greatly influence the usability).

Moreover, immediately after the screen displayed on the television 1 has been changed to the screen for displaying the counterprogram listing 8, the television 1 of the present embodiment displays the counterprogram listing 8 in the state in which the cursor is on the broadcasting station which is broadcasting the television program 3*a* that is currently viewed by the user. With the configuration, when an instruction on displaying the counterprogram listing 8 is given by the user, the television 1 can display the counterprogram listing 8 including thumbnails 5*a* in a short time.

[Configuration of Television]

Figure 4:
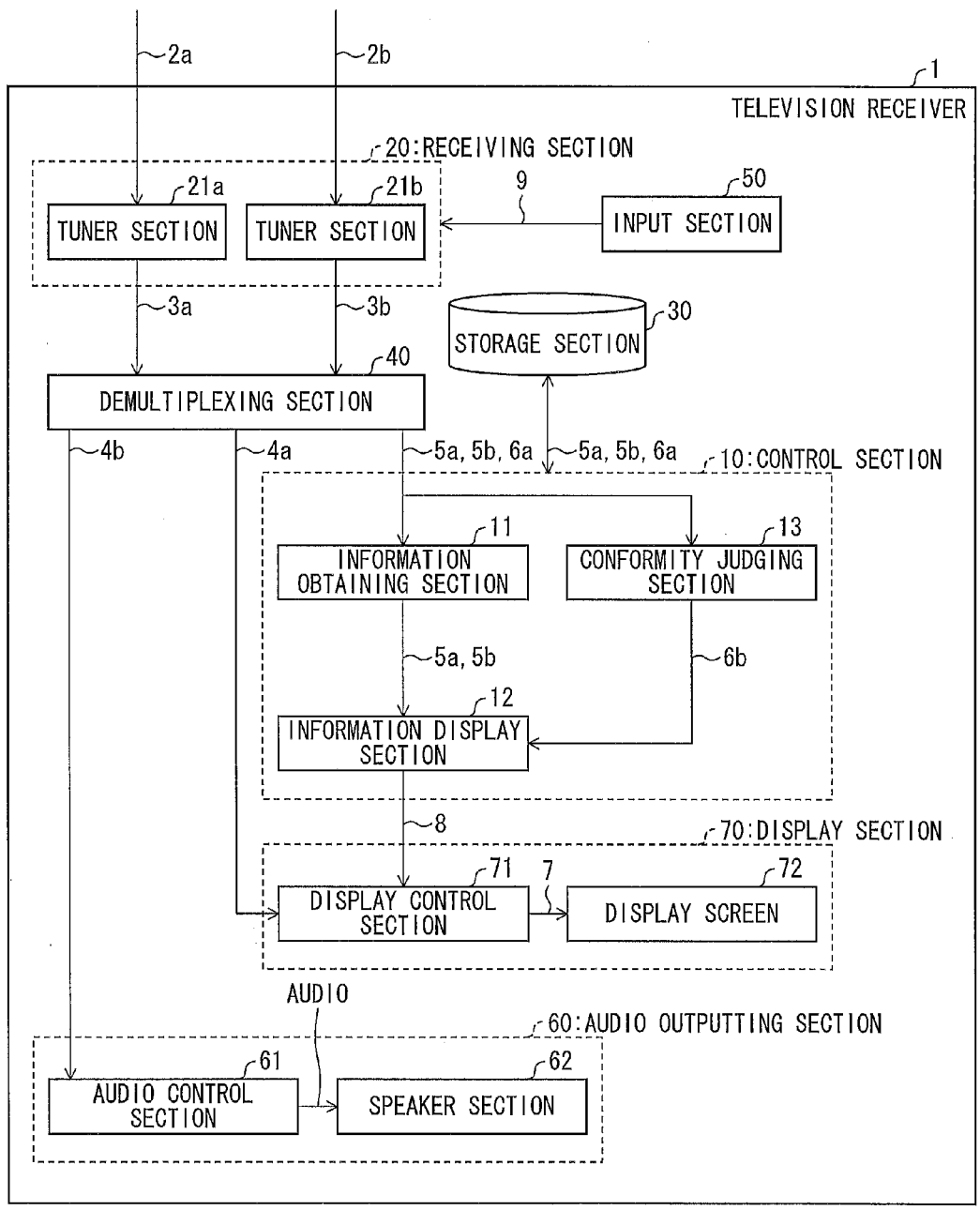
FIG. 4 is a block diagram illustrating a main part configuration of the television receiver.

The following description will discuss a configuration of the television 1 with reference to FIG. 4. FIG. 4 is a block diagram illustrating a main part configuration of the television 1. Note that, in order to secure simplicity of descriptions, parts which do not directly relate to the present embodiment are omitted from the description of the configuration and the block diagram. Note, however, that the television 1 can include the omitted configuration, in accordance with an actual work circumstance.

The television (display device, television receiver) 1 includes a tuner 2*a* for receiving a broadcast wave 2*a* that has been broadcasted by an external broadcasting station. The television 1 list-displays television programs 3 which have been carried by broadcast waves 2*a* received by the tuner 2*a*.

The television 1 receives, as the "content", television programs (content, first content, second content) 3 which have been broadcasted by broadcasting stations (including a main channel and a sub channel). Note that the "content" can encompass, for example, all videos, images, music, audio, texts, characters, mathematical formulae, numerals, and signs which are provided by cable televisions, CS broadcasts, radio broadcasts, DVDs (Digital Versatile Disk), and the Internet.

The television 1 includes a receiving section 20 (tuner section 21a, tuner section 21b), a demultiplexing section 40, a control section 10 (information obtaining section 11, information display section 12, conformity judging section 13), a display section 70 (display control section 71, display screen 72), an audio outputting section 60 (audio control section 61, speaker section 62), a storage section 30, and an input section 50 (see FIG. 4). The following description will discuss functions of the constituent members in an order described above.

The receiving section 20 converts a broadcast wave 2, which has been received from an external broadcasting station, in to a signal (i.e., television program 3) that indicates a content. The receiving section 20 can include, for example, an RF section for converting a signal, which the tuner section 21 has received, into an analog baseband signal, an ADC section for converting the analog baseband signal into a digital baseband signal, a demodulating section for demodulating the digital baseband signal to extract an MPEG2 stream, and a decoding section for decoding the MPEG2 stream to obtain a picture signal (these members are not illustrated). The receiving section 20 includes the tuner section 21a and the tuner section 21b.

Out of all broadcasting stations from which broadcast waves can be received, the receiving section 20 obtains a certain broadcasting station from which a broadcast wave is to be received next, and synchronizes the tuner section 21b with a frequency of the certain broadcasting station.

Similarly, out of all broadcasting stations from which broadcast waves can be received, the receiving section 20 makes a list of broadcasting stations that broadcast respective broadcast waves 2b for carrying television programs 3b which are list-displayed near a television program 3a carried by a broadcast wave 2a which is being received by the tuner section 21a. Then, the receiving section 20 synchronizes the tuner section 21b with frequencies of the respective broadcasting stations included in the list.

Similarly, out of all broadcasting stations from which broadcast waves can be received, the receiving section 20 makes a list of broadcasting stations that broadcast respective broadcast waves 2b for carrying television programs 3b which are list-displayed near the television program 3a which is broadcasted by the broadcasting station (i.e., the broadcasting station in the focused part in FIG. 3) selected in the counterprogram listing 8. Then, the receiving section 20 synchronizes the tuner section 21b with frequencies of the respective broadcasting stations included in the list.

The tuner section (first receiving means) 21a and the tuner section (second receiving means) 21b respectively receive a broadcast wave 2a and a broadcast wave 2b which are broadcasted by respective broadcasting stations. The tuner section 21a and the tuner section 21b respectively output a television program 3a and a television program 3b, which have been converted by the receiving section 20, to the demultiplexing section 40.

Note that the tuner section 21b preferentially receives the broadcast waves 2b for carrying the television programs 3b, which are list-displayed near the television program 3a carried by the broadcast wave 2a received by the tuner section 21a, rather than broadcast waves for carrying television programs which are list-displayed away from the television program 3a.

In a case where the television 1 (information display section 12, later described) displays the counterprogram listing 8 based on a list form in which broadcasting stations are sorted in accordance with a predetermined criterion, the tuner section 21b can receive broadcast waves broadcasted by broadcasting stations which are displayed as adjacent 4 stations including the broadcasting station broadcasting the television program 3a.

In a case where the predetermined criterion is a broadcasting frequency of a broadcasting station and the television 1 displays the counterprogram listing 8 based on a list form in which broadcasting stations are sorted in accordance with the broadcasting frequency, the tuner section 21b can preferentially receive other broadcast waves 2b which are broadcasted with frequencies falling within a predetermined range which includes a frequency of the broadcast wave 2a received by the tuner section 21a.

Note that the "predetermined range" is defined by a unit of frequency in advance, and can be, for example, a range of plus and minus several tens of hertz with respect to the frequency of the broadcast wave 2a.

When a broadcasting station has been selected by user operation, the tuner section 21b preferentially receives broadcast waves 2b for carrying television programs 3b, which are list-displayed near a television program carried by a broadcast wave broadcasted by the selected broadcasting station, rather than broadcast waves for carrying television programs which are list-displayed away from the television program of the selected broadcasting station.

The demultiplexing section 40 divides each of the television program 3a and the television program 3b, which have been respectively inputted from the tuner section 21a and the tuner section 21b, into a picture signal 4a, an audio signal 4b, and other signals (program information 5b, thumbnail 5a, limit information 6a) and outputs (i) the picture signal 4a to the display control section 71, (ii) the audio signal 4b to the audio control section 61, and (iii) the other signals to the information obtaining section 11.

The control section 10 comprehensively controls functions of the television 1. The control section 10 includes the information obtaining section 11, the information display section 12, and the conformity judging section 13.

In a case where the television 1 is in the "viewing" state (later described), the control section 10 judges whether or not the user has set to obtain a program listing in a background. Moreover, the control section 10 judges whether or not it is necessary to obtain thumbnails 5a of television programs 3b because the user has set the television 1 to display the thumbnails 5a in the counterprogram listing 8.

Moreover, the control section 10 (i) deletes, from the list made by the receiving section 20, broadcasting stations whose thumbnails 5a have been obtained and (ii) judges whether or not a broadcasting station whose thumbnail 5a has not been obtained yet remains in the list and whether or not the counterprogram listing 8 is still displayed (i.e., whether or not the television 1 is still in the "counterprogram listing" state).

Further, the control section 10 judges whether or not a selected broadcasting station has been changed. Moreover, the control section 10 judges whether or not there is information (reason for unavailability) indicative of a reason for unable to view a program.

Further, the control section 10 reads out, from the storage section 30, program information 5b at the current time (i.e., EventID recorded in program listing data at the current time). Moreover, the control section 10 reads out, from the storage section 30, (i) a pair of a thumbnail 5a and the program information 5b (EventID) or (ii) the information (reason for unavailability) indicative of a reason for unable to view the program.

The information obtaining section (obtaining means) 11 obtains, from other broadcast wave 2b received by the tuner section 21b, a thumbnail 5a which indicates other television program 3b carried by the other broadcast wave 2b. Further, the information obtaining section 11 obtains program information 5b on the other television program 3b from the other broadcast wave 2b received by the tuner section 21b.

More specifically, the information obtaining section sets a decoder and a section filter such that the thumbnail 5a and the program information 5b (e.g., EIT[sch] of EPG information) can be obtained, and waits until the thumbnail 5a and the program information 5b are obtained. Note that the information obtaining section 11 can cause the storage section 30 to store the thumbnail 5a and the program information 5b which have been thus obtained.

The information obtaining section 11 further obtains limit information 6a that indicates whether or not to permit viewing the television program 3b. In a case where the limit information indicates that the television program 3b cannot be viewed, the information obtaining section 11 does not obtain the thumbnail 5a of the television program 3b. In this case, the information obtaining section 11 can obtain information indicative of a reason for unable to view the television program 3b, instead of obtaining the thumbnail 5a.

More specifically, the information obtaining section 11 sets the section filter such that limit information 6a (also referred to as "contractual information") can be obtained, and waits until the limit information 6a is obtained. Then, the information obtaining section 11 judges, based on the limit information 6a, whether or not the television program 3b can be viewed, and consequently judges whether or not to obtain the thumbnail 5a. In a case where the information obtaining section 11 determines not to obtain the thumbnail 5a because the television program 3b cannot be viewed, the information obtaining section 11 obtains information indicating a reason for unable to view the television program 3b, and causes the storage section 30 to store the information as thumbnail data.

Note that the limit information 6a is information indicating that viewing of a subject content is limited. Examples of the limit information 6a encompass information relating to a contract for viewing contents, information indicative of whether or not being scrambled, information on age limit for viewing, and information relating to defective reception. The limit information 6a can be obtained by, for example, PMT, EIT[p], or a B-CAS card response of ECM.

The information indicating a reason for unable to view is information indicating a reason why the viewing is restricted by the limit information 6a, that is, indicates a reason which varies depending on which one of the above exemplified pieces of information the limit information 6a indicates.

The information display section (display means) 12 displays the thumbnail 5a and the program information 5b, which have been obtained by the information obtaining section 11, in a predetermined form in which a broadcasting station broadcasting the broadcast wave 2a received by the tuner section 21a or a broadcasting station selected by user operation can be selected first.

Specifically, the information display section 12 generates a counterprogram listing 8 based on the thumbnail 5a and the program information 5b inputted from the information obtaining section 11, and outputs the counterprogram listing to the display control section 71. Note, however, that, in a case where the conformity judging section 13 determines inconformity (i.e., information 6b indicative of the inconformity is inputted from the conformity judging section 13), the information display section 12 does not display the thumbnail 5a thus judged. Alternatively, the information display section 12 displays, in the counterprogram listing 8, the thumbnail 5a, an icon which indicates the reason for unable to view, or an icon which indicates that no thumbnail 5a exists.

In a case where the information obtaining section 11 has obtained the information indicating a reason for unable to view, the information display section 12 can display the information indicating the reason and the program information 5b in a predetermined form.

The conformity judging section (judging means) 13 judges whether or not the thumbnail 5a obtained by the information obtaining section 11 conforms to a content of the television program 3b carried by the broadcast wave 2b received by the tuner section 21b.

More specifically, the conformity judging section 13 judges whether or not an EventID of a current program conforms to an EventID of the thumbnail 5a. The conformity judging section 13 outputs, to the information display section 12, judgment information 6b which indicates a result of the judgment.

The display section 70 displays, toward the user, the information (counterprogram listing 8) which has been processed in the control section 10 and a picture signal 4a inputted from the demultiplexing section 40. The display section 70 includes the display control section 71 and the display screen 72.

The display control section 71 combines the picture signal 4a, which has been inputted from the demultiplexing section 40, with the counterprogram listing 8, which has been inputted from the information display section 12, so as to generate display data 7 with which the counterprogram listing 8 can be displayed on the display screen 72 in a final form illustrated in FIG. 3, and outputs the display data 7 to the display screen 72.

The display data 7 contains all pieces of information to be ultimately displayed on the display screen 72 of the television 1. The display data 7 can be, for example, an image in a bitmap format, an image in another format, or data in other format suitable for display.

The display screen 72 is a device for displaying the display data 7 inputted from the display control section 71. According to the present embodiment, the display screen 72 is mainly assumed to be a liquid crystal display (LCD). Note, however, that the display screen 72 is not limited to a particular kind of hardware, provided that the device has a display function (in particular, flat-panel display). The display screen 72 can be configured by, for example, (i) a display element such as a plasma display panel (PDP) or an EL (electroluminescence) display and (ii) a driver circuit for driving the display element based on the display data 7 inputted from the display control section 71.

The audio outputting section 60 externally outputs audio contained in the television program 3a. The audio outputting section 60 includes the audio control section 61 and the speaker section 62.

The audio control section 61 converts the audio signal 4b, which has been inputted from the demultiplexing section 40, into audio and then outputs the audio to the speaker section 62. The audio control section 61 can be configured by, for example, an audio outputting process circuit such as an amplifier.

The speaker section 62 is a speaker for externally outputting the audio inputted from the audio control section 61.

The storage section 30 is a storage device configured to store the program information 5b, the thumbnail 5a, and the limit information 6a. The storage section 30 can be configured by, for example, a hard disk, a semiconductor memory, or a DVD, and is particularly preferably configured by a RAM (Random Access Memory). According to the present embodiment, the storage section 30 is illustrated in FIG. 1 as a device included in the television 1. Note, however, that the storage section 30 can be an external storage device which is communicably connected with the television 1.

The input section 50 accepts user operation, and outputs inputted information (user input 9) to the receiving section 20. This allows the user to select a broadcasting station to be viewed. The input section 50 is not limited to a particular interface, provided that the interface can accept an input by the user. The input section 50 can be a device which receives an input signal from a general input interface such as a remote controller, a button provided on the television 1, a keyboard, or a mouse.

Note that the interface used by the user to input can be an interface other than a hardware interface having a physical button. For example, it is possible that a remote controller has a liquid crystal screen including a touch panel, and the user operates the television 1 by pressing a software key displayed on the liquid crystal screen.

[Details of Counterprogram Listing]

Figure 5:
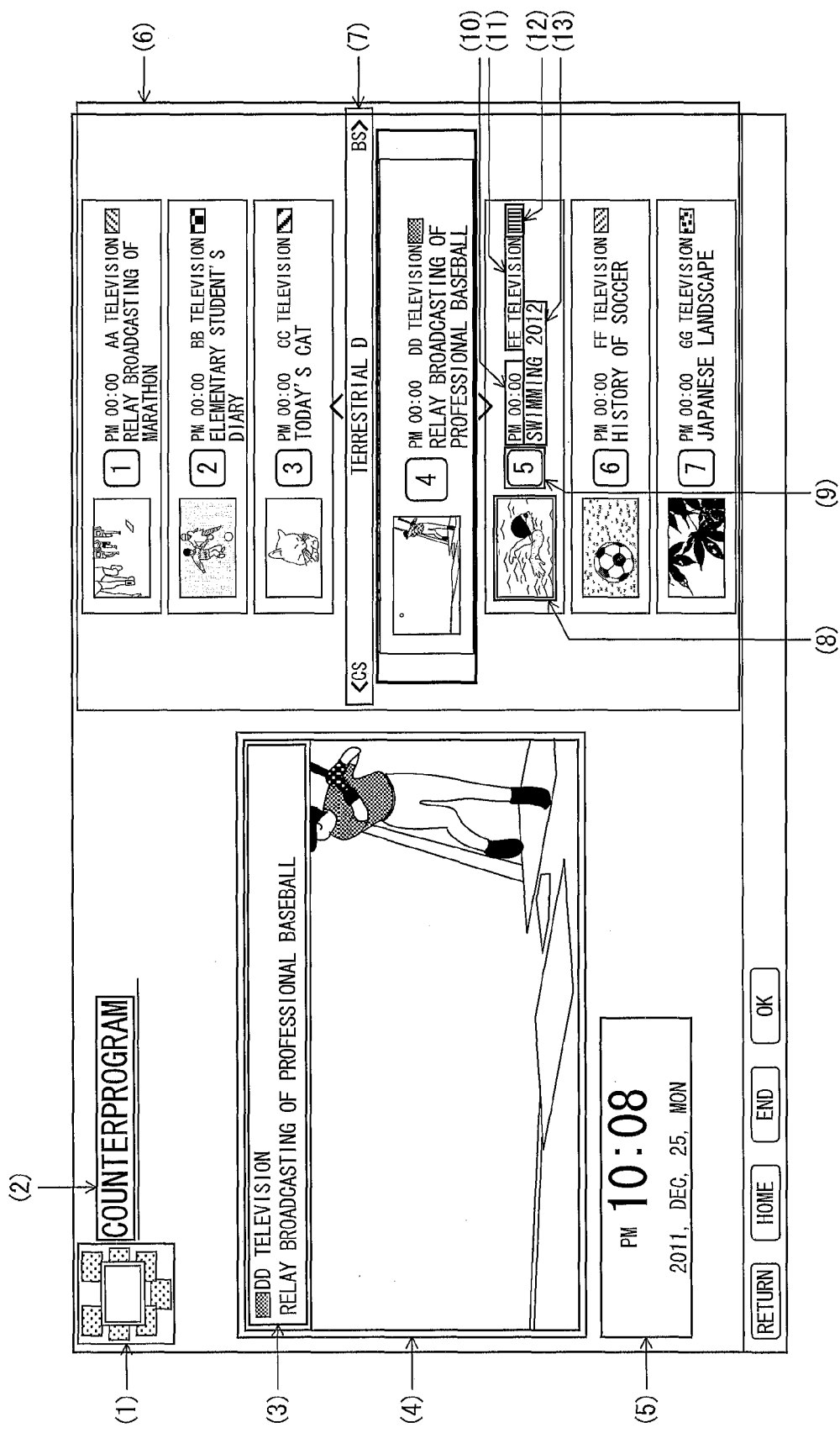
FIG. 5 is a view illustrating details of parts in the configuration of the counterprogram listing screen.

The following description will discuss details of the screen displaying the counterprogram listing 8, with reference to FIG. 5. FIG. 5 is a view illustrating details of parts in the screen for displaying the counterprogram listing 8. The parts indicated by (1) through (13) in FIG. 5 are as follows:

That is, (1) is a logo representing the screen for displaying the counterprogram listing 8, (2) is a character string for explicitly indicating that a current screen is the screen for displaying the counterprogram listing 8, (3) is an overview of the television program 3a (such as a name of the broadcasting station) which the user is viewing, (4) is the television program 3a which the user is viewing, (5) is a display of time and date, (6) is the counterprogram listing 8, (7) is a display of a broadcast wave type, (8) is a thumbnail 5a, (9) is direct selection display, (10) is an end time of the television program 3b, (11) is a name of a broadcasting station, (12) is a logo of a broadcasting station, and (13) is a title of the television program 3b.

In the counterprogram listing 8 of (6) in FIG. 5, the television 1 displays 7 broadcasting stations in respective rows of a broadcasting station list. In a case where the user holds down a predetermined key for changing a broadcasting station on which the cursor is superimposed, the television 1 rotates the counterprogram listing 8 while subjecting the counterprogram listing 8 to an effect of giving a depth.

In a case where the television 1 is connected with a network and the user presses a right key or a left key of the remote controller, the television 1 circulates "IPTV", "digital terrestrial broadcasting", "BS broadcasting", and "CS broadcasting" in the broadcast wave type of (7).

In a case where the television 1 is not connected with a network and the user presses the right key or the left key of the remote controller, the television 1 circulates "digital terrestrial broadcasting", "BS broadcasting", and "CS broadcasting" in the broadcast wave type of (7).

Note that an order of the circulation can be set arbitrarily. Moreover, the user can switch the broadcast wave type also by directly pressing a predetermined key of the remote controller for switching the broadcast wave.

[Operating State of Television]

The television 1 has the following three operating states. That is:

(1) A "viewing" state in which the user is constantly viewing a television program 3a which is broadcasted by a predetermined broadcasting station.

(2) An "after channel selection" state which is immediately after the user has switched the broadcasting station and therefore a broadcast wave 2a received by the tuner section 21a is changed.

(3) A "counterprogram listing" state in which the television 1 is displaying the counterprogram listing 8 (see FIG. 3).

[Processes Carried Out by Television]

The following description will discuss concrete processes carried out in each flow, that is, processes in the "viewing" state, processes in the "after channel selection" state, processes in the "counterprogram listing" state, processes for obtaining thumbnails while taking into consideration an age limit and a noncontractual sate, and processes for displaying the counterprogram listing while taking into consideration switching of television programs, in this order.

(Processes in "Viewing" State)

Figure 6:
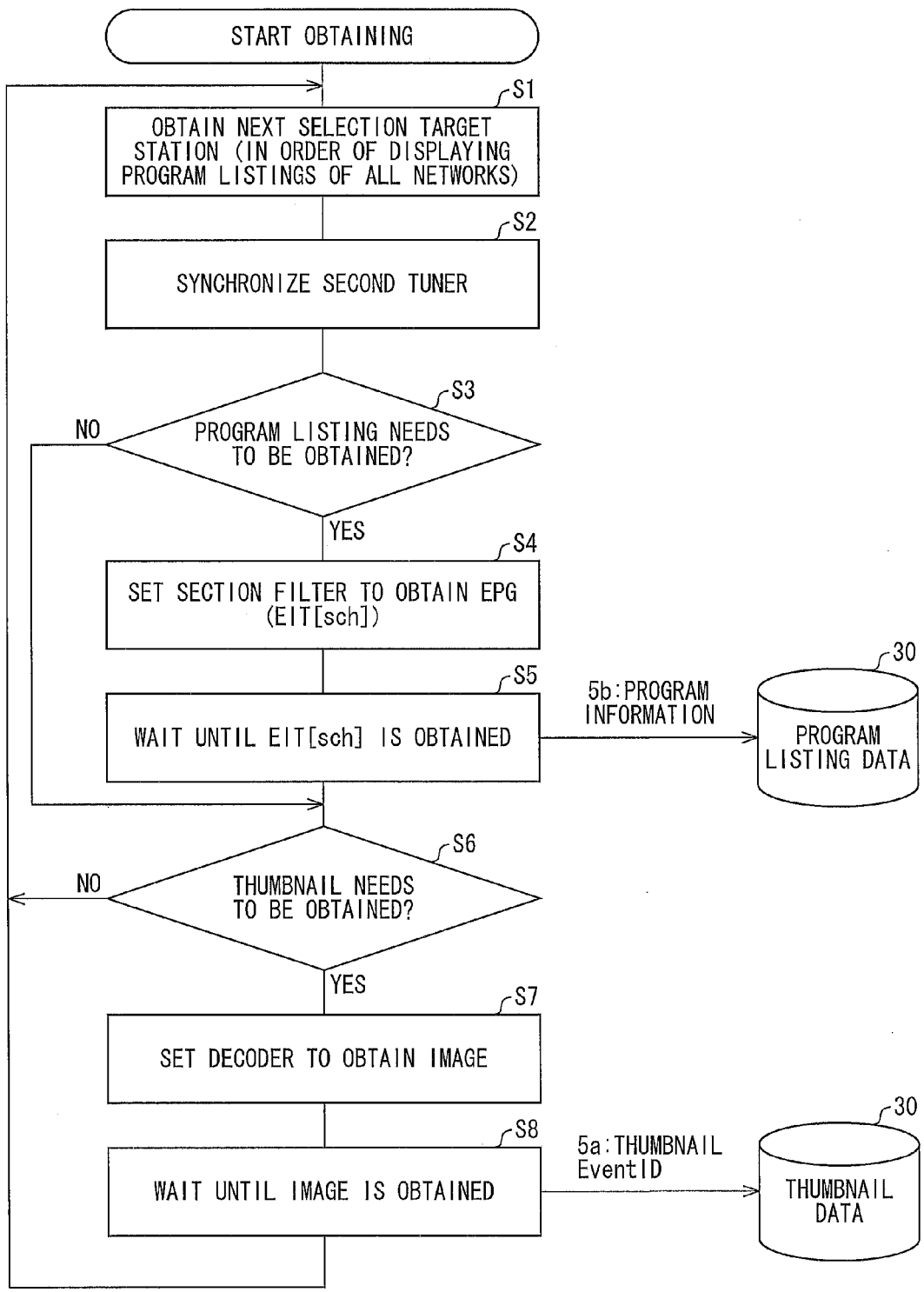
FIG. 6 is a flowchart illustrating an example of processes carried out by the television receiver which is in a "viewing" state.

The following description will discuss a flow of processes carried out by the television 1 which is in the "viewing" state, with reference to FIG. 6. FIG. 6 is a flowchart illustrating an example of processes carried out by the television 1 which is in the "viewing" state.

The receiving section 20 obtains, out of all broadcasting stations from which broadcast waves can be received, a broadcasting station (selection target station) from which a broadcast wave is to be received next (step 1, hereinafter abbreviated as "S1"), and synchronizes the tuner section 21b (second tuner) with a frequency of the broadcasting station (S2). Next, the control section 10 judges whether or not a program listing needs to be obtained (S3). That is, in a case where the television 1 is in the "viewing" state, the control section 10 judges whether or not the user has set to obtain the program listing in a background.

In a case where the program listing needs to be obtained (YES in S3), the information obtaining section 11 sets the section filter such that program information 5b (e.g., EIT[sch] of EPG information) can be obtained (S4), and the information obtaining section 11 waits until the program information 5b is obtained (S5). Note that the information obtaining section 11 causes the storage section 30 to store the obtained program information 5b.

Next, the control section 10 judges whether or not a thumbnail needs to be obtained (S6). That is, the control section 10 judges whether or not a thumbnail 5a of a television program 3b needs to be obtained because the user has set the television 1 to display the thumbnail 5a in the counterprogram listing 8.

In a case where it is determined that the thumbnail 5a needs to be obtained (YES in S6), the information obtaining section 11 sets a decoder so that the thumbnail 5a can be obtained (S7), and the information obtaining section 11 waits until the thumbnail 5a is obtained (S8). Note that the information obtaining section 11 causes the storage section 30 to store the obtained thumbnail 5a. In this case, together with the thumbnail 5a, the information obtaining section 11 obtains, as a part of the program information 5b, a signal (e.g., EventID) with which the television program 3 can be identified, and the information obtaining section 11 also causes the storage section 30 to store the obtained signal.

The television 1 in the "viewing" state carries out the processes of the steps S1 through S8 with respect to all the broadcasting stations from which broadcast waves can be received. That is, the television 1 carries out the process of obtaining the program information 5b and the process of obtaining the thumbnail 5a with respect to each of all the broadcasting stations in a predetermined order.

That is, the television 1 includes two receiving devices (i.e., the tuner section 21a and the tuner section 21b) for receiving broadcast waves 2, and one of the tuner sections 21a and 21b is used to receive the television program 3a which the user is viewing. Therefore, the thumbnail 5a and the program information 5b are to be received only by the other of the tuner sections 21a and 21b. Under the circumstances, the television 1 alternately obtains the thumbnail 5a and the program information 5b as described in the steps S3 through S8.

(Processes in "after Channel Selection" State)

Figure 7:
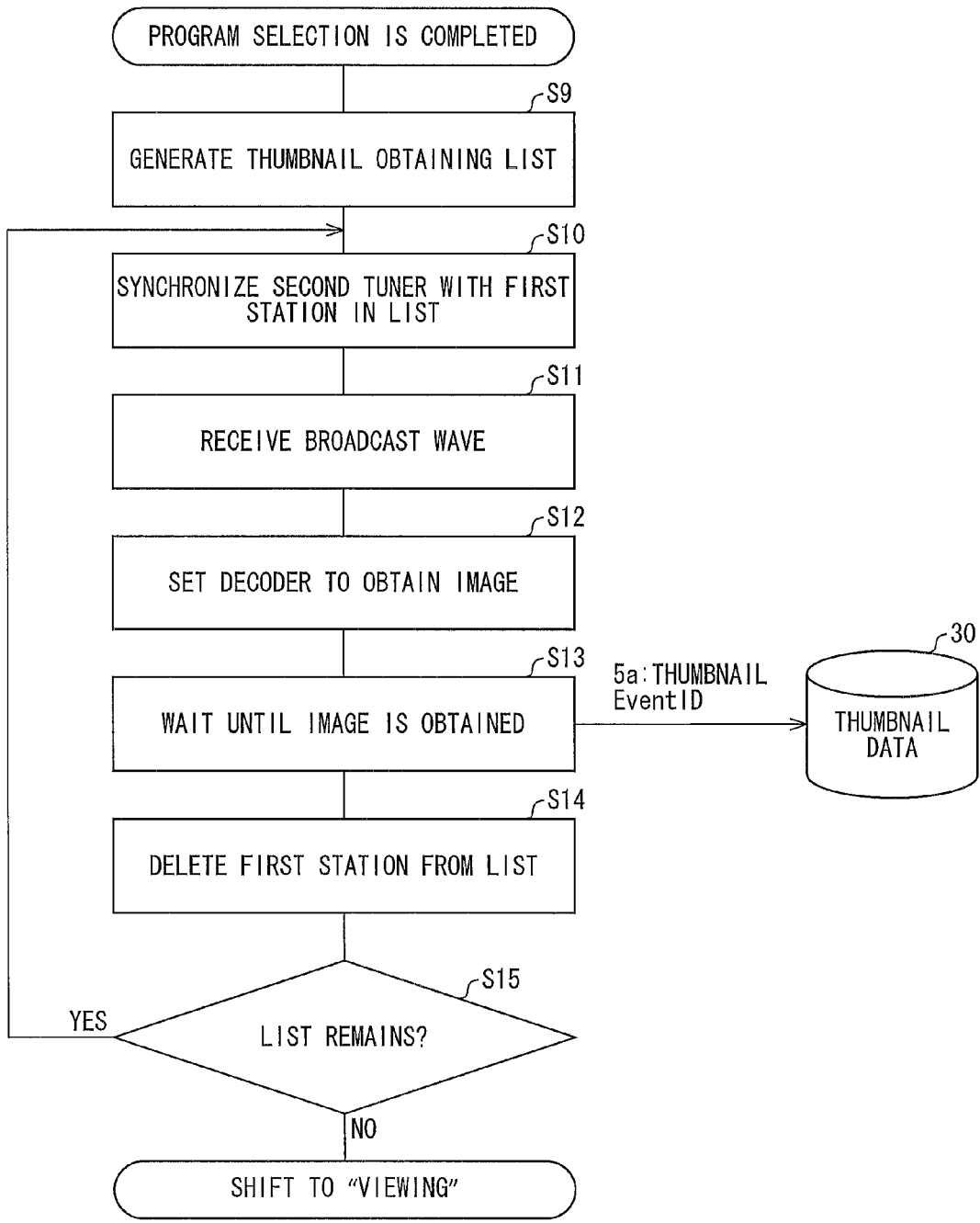
FIG. 7 is a flowchart illustrating an example of processes carried out by the television receiver which is in an "after channel selection" state.

The following description will discuss a flow of processes carried out by the television 1 which is in the "after channel selection" state, with reference to FIG. 7. FIG. 7 is a flowchart illustrating an example of processes carried out by the television 1 which is in the "after channel selection" state. Note that, in the descriptions below, a phrase " . . . step" in parentheses indicates each of steps in a controlling method (the same applies to the other drawings).

The receiving section 20 generates a thumbnail obtaining list (S9). Specifically, out of all broadcasting stations from which broadcast waves can be received, the receiving section 20 makes a list of broadcasting stations that broadcast respective broadcast waves 2b for carrying television programs 3b which are list-displayed near the television program 3a which is carried by the broadcast wave 2a received by the tuner section 21a. Then, the receiving section 20 synchronizes the tuner section 21b with frequencies of the broadcasting stations included in the list (S10).

The tuner section 21b receives the broadcast wave 2b (S11, second receiving step). Next, the information obtaining section 11 sets the decoder such that a thumbnail 5a can be obtained (S12), and the information obtaining section 11 waits until the thumbnail 5a is obtained (S13, obtaining step). As above described, in this case, the information obtaining section 11 causes the storage section 30 to store the obtained thumbnail 5a. Moreover, it is possible that the information obtaining section 11 also obtains program information 5b (EventID) of the thumbnail 5a and causes the storage section 30 to store the program information 5b so that the thumbnail 5a and the program information 5b are associated with each other.

The control section 10 deletes, from the list, broadcasting stations whose thumbnails 5a have been obtained (S14), and judges whether or not a broadcasting station whose thumbnail 5a has not been obtained yet remains in the list (S15). In a case where such a broadcasting station remains in the list (YES in S15), the control section 10 carries out the processes of the steps S10 through S14 again. In a case where such a broadcasting station does not remain in the list (NO in S15), the control section 10 changes a state of the television 1 to the "viewing" state.

(Processes in "Counterprogram Listing" State)

Figure 8:
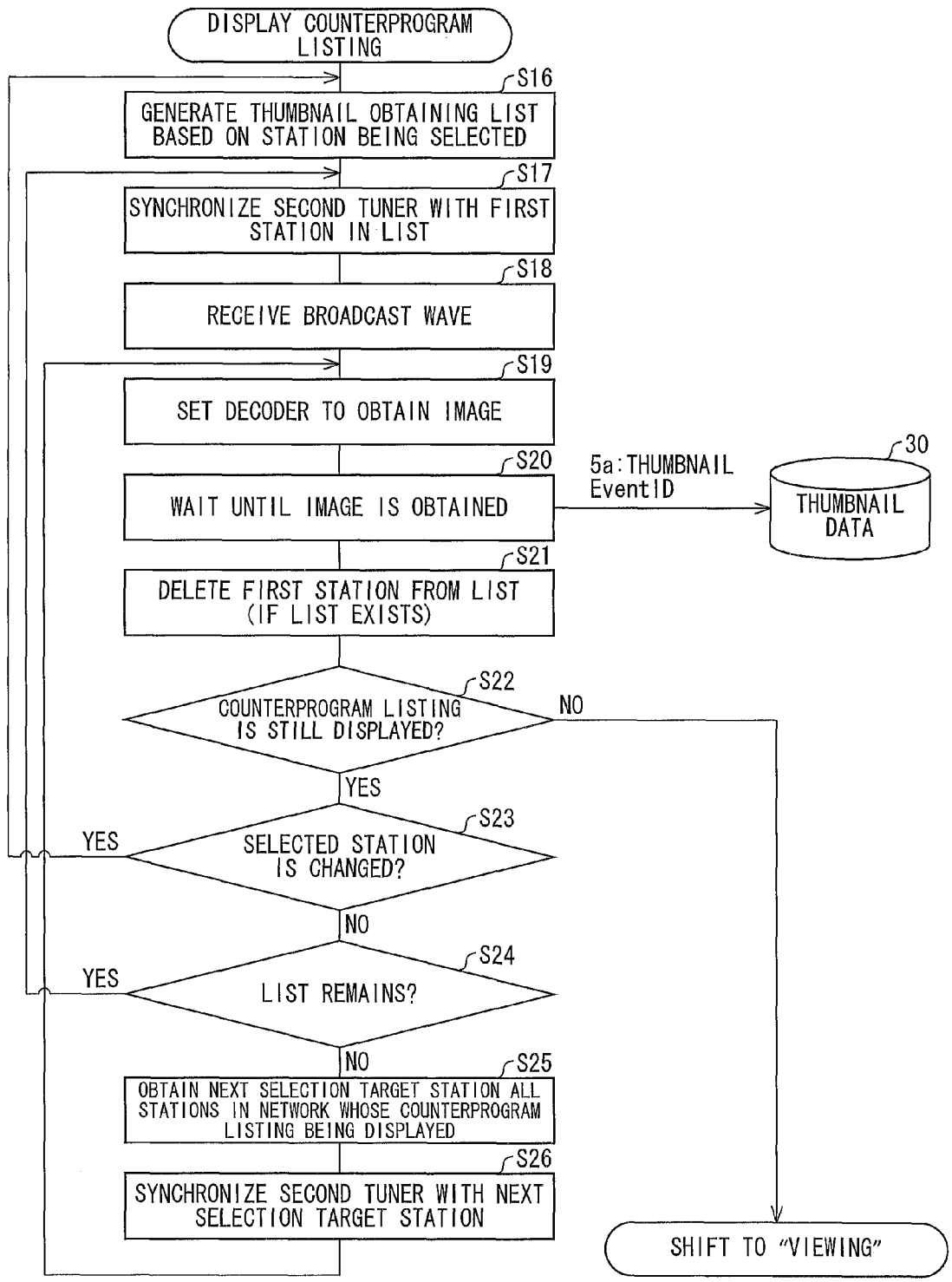
FIG. 8 is a flowchart illustrating an example of processes carried out by the television receiver which is in a "counterprogram listing" state.

The following description will discuss a flow of processes carried out by the television 1 which is in the "counterprogram listing" state, with reference to FIG. 8. FIG. 8 is a flowchart illustrating an example of processes carried out by the television 1 which is in the "counterprogram listing" state.

The receiving section 20 generates a thumbnail obtaining list based on a broadcasting station which is being selected (S16). Specifically, out of all broadcasting stations from which broadcast waves can be received, the receiving section 20 makes a list of broadcasting stations that broadcast respective broadcast waves 2b for carrying television programs 3b which are list-displayed near the television program 3a which is broadcasted by a broadcasting station (i.e., the broadcasting station in the focused part in FIG. 3) selected in the counterprogram listing 8. Then, the receiving section 20 synchronizes the tuner section 21b with frequencies of the respective broadcasting stations included in the list (S17).

The tuner section 21b receives the broadcast wave 2b (S18, second receiving step). Next, the information obtaining section 11 sets the decoder such that a thumbnail 5a can be obtained (S19), and the information obtaining section 11 waits until the thumbnail 5a is obtained (S20, obtaining step). As above described, in this case, the information obtaining section 11 causes the storage section 30 to store the thumbnail 5a and an EventID which are thus obtained.

The control section 10 deletes, from the list, broadcasting stations whose thumbnails 5a have been obtained (S21), and judges whether or not the counterprogram listing 8 is still displayed (i.e., whether or not the television 1 is still in the "counterprogram listing" state) (S22). In a case where the counterprogram listing 8 is no longer displayed (NO in S22), the control section 10 changes a state of the television 1 to the "viewing" state.

On the other hand, in a case where the counterprogram listing 8 is still displayed (YES in S22), the control section 10 judges whether or not the selected broadcasting station has been changed (S23). In a case where the selected broadcasting station has been changed (YES in S23), the control section 10 carries out the processes of the steps S16 through S22 again. In a case where the selected broadcasting station has not been changed (NO in S23), the control section 10 judges whether or not a broadcasting station whose thumbnail 5a has not been obtained yet remains in the list (S24).

In a case where such a broadcasting station remains in the list (YES in S24), the control section 10 carries out the processes of the steps S17 through S24 again. On the other hand, in a case where such a broadcasting station does not remain in the list (NO in S24), the receiving section 20 obtains, out of all broadcasting stations from which broadcast waves can be received, a broadcasting station (selection target station) from which a broadcast wave is to be received next (S25), synchronizes the tuner section 21b with a frequency of the broadcasting station (S26), and carries out the processes of the steps S19 through S24 again.

(Processes for Obtaining Thumbnail while Taking into Consideration Age Limit and Noncontractual Sate)

Figure 9:
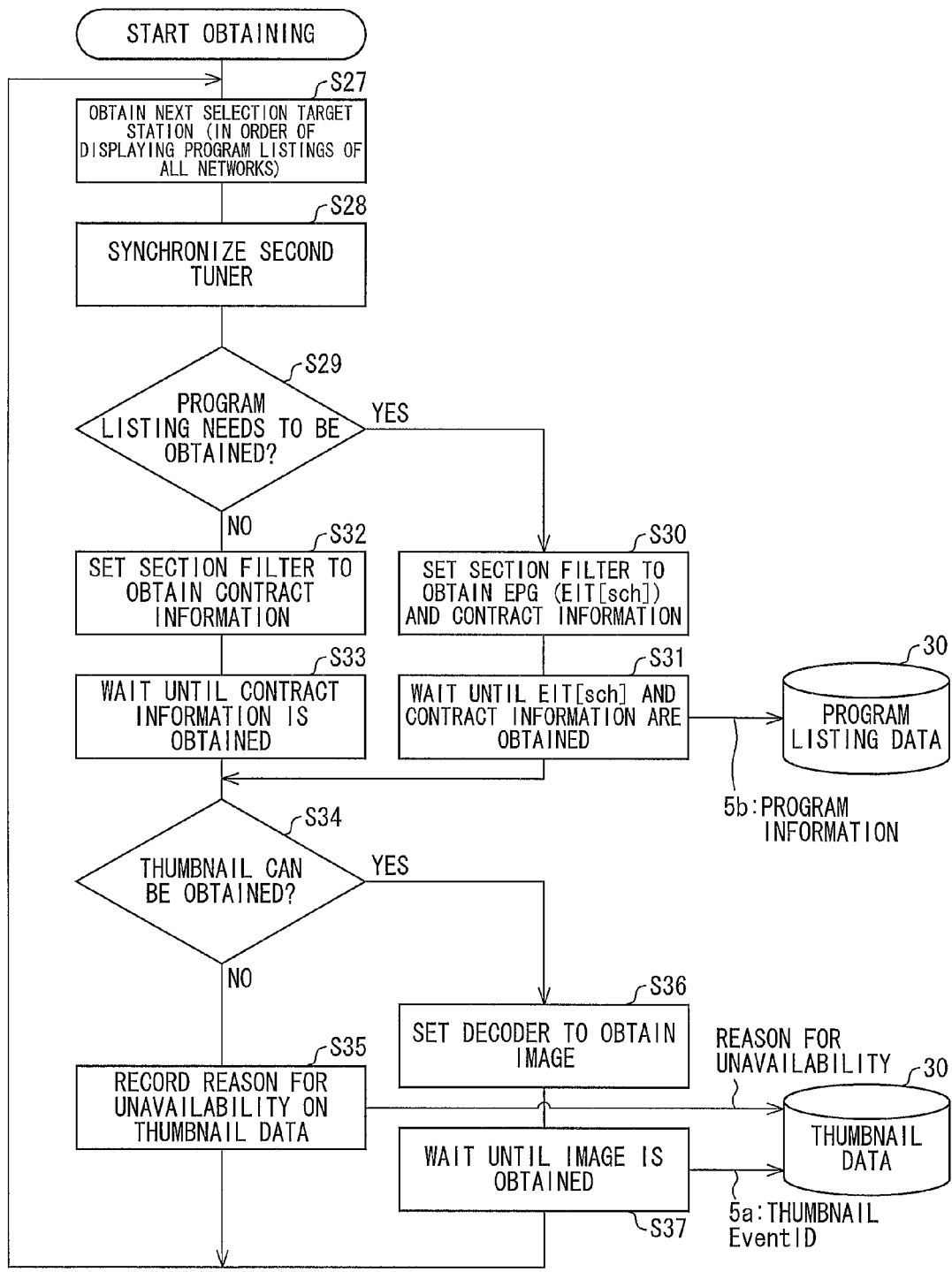
FIG. 9 is a flowchart illustrating an example of processes carried out in the television receiver in a case where the television receiver in the "viewing" state obtains thumbnails while taking into consideration an age limit and a noncontractual sate.

The following description will discuss a flow of processes carried out by the television 1, which is in the "viewing" state, for obtaining a thumbnail while taking into consideration an age limit and a noncontractual sate, with reference to FIG. 9. FIG. 9 is a flowchart illustrating an example of processes carried out by the television 1 in this case.

The receiving section 20 obtains, out of all broadcasting stations from which broadcast waves can be received, a broadcasting station (selection target station) from which a broadcast wave is to be received next (S27), and synchronizes the tuner section 21b with a frequency of the broadcasting station (S28). Next, the control section 10 judges whether or not a program listing needs to be obtained (S29, see S3 of FIG. 6).

In a case where the program listing needs to be obtained (YES in S29), the information obtaining section 11 sets the section filter such that program information 5b (e.g., EIT[sch] of EPG information) and contractual information (limit information 6a) can be obtained (S30), and the information obtaining section 11 waits until the program information 5b and the contractual information are obtained (S31). Note that the information obtaining section 11 causes the storage section 30 to store the obtained program information 5b.

On the other hand, in a case where the program listing does not need to be obtained (NO in S29), the information obtaining section 11 sets the section filter such that the contractual information (limit information 6a) can be obtained (S32), and the information obtaining section 11 waits until the contractual information is obtained (S33).

The information obtaining section 11 judges, based on the contractual information (limit information 6a), whether or not a television program 3b can be viewed, and consequently judges whether or not a thumbnail 5a can be obtained (S34). In a case where it is determined that the thumbnail 5a cannot be obtained because the television program 3b cannot be viewed (NO in S34), the information obtaining section 11 obtains information indicating a reason for unable to view, and causes the storage section 30 to store the information as thumbnail data (S35).

In a case where it is determined that the thumbnail 5a can be obtained (YES in S34), the information obtaining section 11 sets the decoder such that the thumbnail 5a can be obtained (S36), and the information obtaining section 11 waits until the thumbnail 5a is obtained (S37). Note that, as above described, the information obtaining section 11 causes the storage section 30 to store the obtained thumbnail 5a. In this case, together with the thumbnail 5a, the information obtaining section 11 obtains, as a part of the program information 5b, a signal (e.g., EventID) with which the television program 3 can be identified, and the information obtaining section 11 also causes the storage section 30 to store the obtained signal.

(Process for Displaying Counterprogram Listing while Taking into Consideration Switching of Television Programs)

Figure 10:
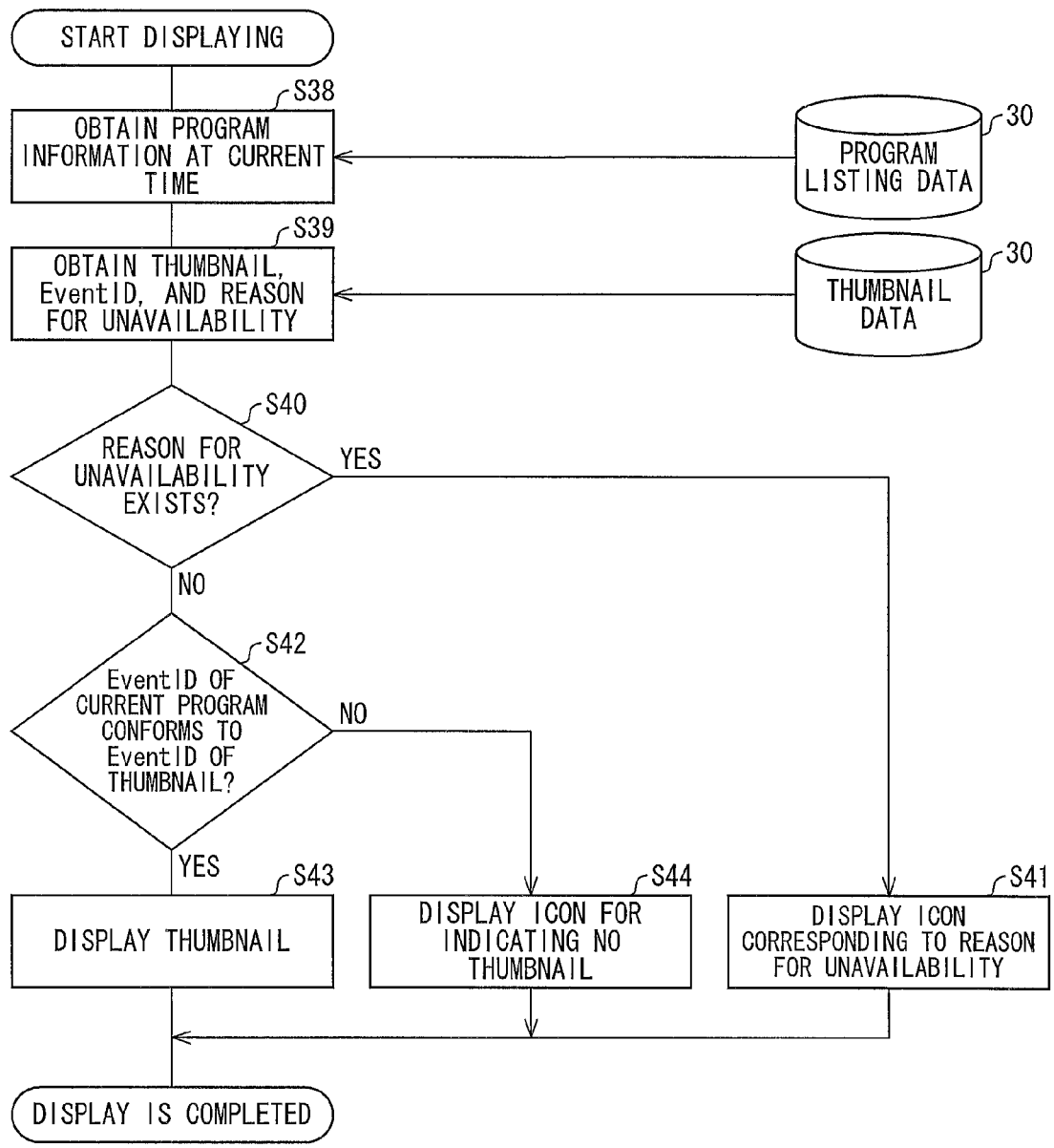
FIG. 10 is a flowchart illustrating an example of processes carried out in the television receiver in a case where a counterprogram listing is displayed while taking into consideration switching of television programs.

The following description will discuss a flow of processes carried out by the television 1 for displaying the counterprogram listing while taking into consideration switching of television programs, with reference to FIG. 10. FIG. 10 is a flowchart illustrating an example of processes carried out by the television 1 in this case.

The control section 10 reads out, from the storage section 30, program information 5b at the current time (i.e., an EventID recorded in program listing data at the current time) (S38). Moreover, the control section 10 reads out, from the storage section 30, (i) a pair of a thumbnail 5a and the program information 5b (EventID) or (ii) information (reason for unavailability) indicative of a reason for unable to view the program (S39).

The control section 10 judges whether or not the reason for unavailability exists (S40). In a case where it is determined that the reason for unavailability exists (YES in S40), the information display section 12 causes an icon, which indicates the reason, to be displayed in the counterprogram listing 8 instead of the thumbnail 5a. On the other hand, in a case where it is determined that the reason for unavailability does not exist (NO in S40), the conformity judging section 13 judges whether or not an EventID of a current program conforms to an EventID of the thumbnail 5a (S42, judging step).

In a case where it is determined that the EventIDs conform to each other (YES in S42), the information display section 12 causes the thumbnail to be displayed in the counterprogram listing 8 (S43). On the other hand, in a case where it is determined that the EventIDs do not conform to each other (NO in S42), the information display section 12 causes an icon, which indicates that no thumbnail 5a exists, to be displayed in the counterprogram listing 8 instead of the thumbnail 5a (S44).

(Processes for Displaying Counterprogram Listing while Taking into Consideration Parental Setting)

Figure 11:
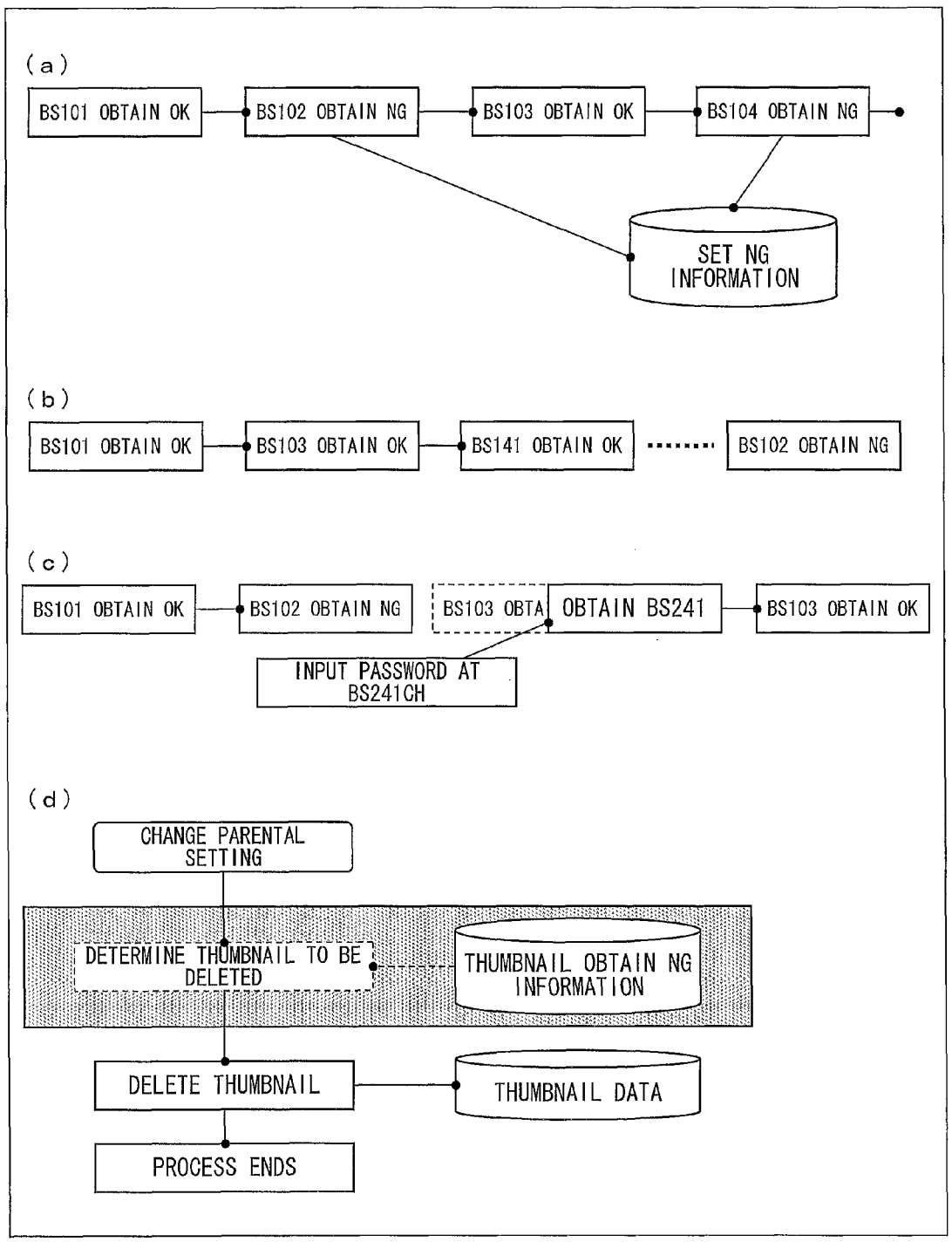
FIG. 11 is a view schematically illustrating an example of processes carried out in the television receiver in a case where a counterprogram listing is displayed while taking into consideration a parental setting.

The following description will discuss a flow of processes carried out by the television 1 for displaying the counterprogram listing while taking into consideration a parental setting, with reference to FIG. 11. FIG. 11 is a view schematically illustrating, in (a) through (d), an example of processes carried out by the television 1 in this case.

The information obtaining section 11 obtains pieces of parental information (limit information; information indicating whether or not a parent of a user restricts use of a content while regarding the content as being possible to adversely affect the user) which relate to respective television programs 3b before obtaining thumbnails 5a representing the respective television programs 3b (see (a) of FIG. 11). Then, the information obtaining section 11 judges whether or not a television program 3b is subjected to a parental setting, and consequently judges whether or not a thumbnail 5a can be obtained. In a case where it is determined that the thumbnail 5a cannot be obtained, the information obtaining section 11 causes the storage section to store program information 5b with which the television program 3b can be identified.

In a case where the program information is stored in the storage section 30 as illustrated in (b) of FIG. 11, the information obtaining section 11 omits to obtain the thumbnail 5a representing the television program. By thus making the parental settings, the television 1 can solve the problem of taking a longer time to obtain thumbnails 5a (i.e., the thumbnails 5a can be obtained quickly), and it is therefore possible to further improve user-friendliness.

Note that the processes illustrated in (a) and (b) of FIG. 11 can be carried out as follows: That is, in a case where (i) it takes time to obtain the thumbnail 5a or (ii) the thumbnail 5a cannot be obtained because a parental setting is made with respect to the television program 3b broadcasted by a broadcasting station, the information obtaining section 11 causes the storage section 30 to store (i) program information 5b with which the television program 3b, which required long time to obtain, can be identified or (ii) program information 5b with which a television program 3b, whose thumbnail 5a could not be obtained, can be identified. In a case where the program information is stored in the storage section 30, the information obtaining section 11 omits to obtain the thumbnail 5a representing the television program. In a case where the processes are thus carried out, it is not necessary to obtain parental information before obtaining the thumbnail 5a. By thus making the parental settings, the television 1 can solve, more easily, the problem of taking a longer time to obtain thumbnails 5a (i.e., the thumbnails 5a can be obtained more easily and quickly), and it is therefore possible to further improve user-friendliness.

In a case where the parental setting is cancelled as illustrated in (c) of FIG. 11 (by a predetermined cancelling operation such as inputting a password), the information obtaining section 11 detects the cancellation of setting and obtains a thumbnail 5a of a television program 3b whose parental setting has been thus cancelled. As such, when the parental setting is changed (i.e., cancelled in the above case), the television 1 can immediately and surely reflect such a change. It is therefore possible to further improve user-friendliness.

In a case where the parental setting is changed by the user as illustrated in (d) of FIG. 11, the information obtaining section 11 deletes all thumbnails 5a stored in the storage section 30. Then, the information obtaining section 11 obtains again thumbnails 5a from broadcast waves broadcasted by adjacent broadcasting stations including a broadcasting station which is broadcasting the television program 3a that is currently viewed. As such, when the parental setting is changed, the television 1 can immediately and surely reflect such a change. It is therefore possible to further improve user-friendliness.

[Hardware Configuration of Television]

Figure 12:
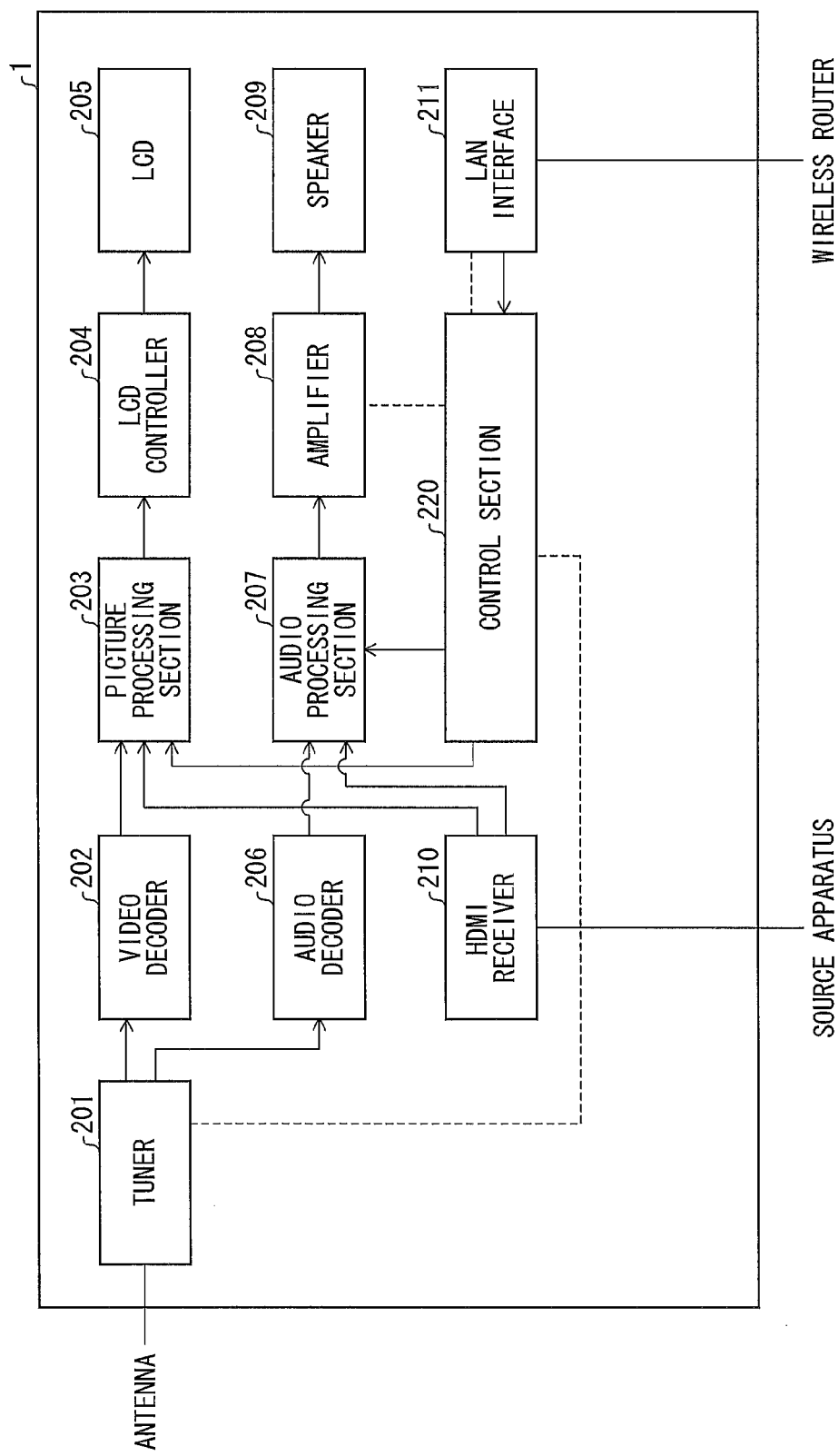
FIG. 12 is a block diagram illustrating a hardware configuration of the television receiver.

The following description will discuss a hardware configuration of the television 1 which relates to a function as a so-called "television receiver", with reference to FIG. 12. FIG. 12 is a block diagram illustrating a hardware configuration of the television 1.

As illustrated in FIG. 12, the television 1 includes a tuner 201, a video decoder 202, a picture processing section 203, a LCD controller 204, a LCD 205, an audio decoder 206, an audio processing section 207, an amplifier 208, a speaker 209, an HDMI (Registered Trademark) receiver 210, a LAN interface 211, and a control section 220.

The tuner 201 demodulates an encoded picture signal and an encoded audio signal from a broadcast wave of terrestrial digital broadcasting, BS broadcasting, or CS broadcasting. The video decoder 202 decodes the encoded picture signal which has been demodulated by the tuner 201. The picture signal, which has been decoded by the video decoder 202, is broadcasted to the LCD controller 204 via the picture processing section 203. The LCD controller 204 controls the LCD 205 to display a picture represented by the picture signal which has been processed by the picture processing section 203. The audio decoder 206 decodes the encoded audio signal which has been demodulated by the tuner 201. The audio signal, which has been decoded by the audio decoder 206, is broadcasted to the amplifier 208 via the audio processing section 207. The amplifier 208 drives the speaker 209 to output audio represented by the audio signal which has been processed by the audio processing section 207.

The HDMI receiver 210 receives a picture signal and an audio signal supplied from a source apparatus. The picture signal and the audio signal, which have been received by the HDMI receiver 210, are broadcasted to the picture processing section 203 and the audio processing section 207, respectively, and are then outputted by the LCD 205 and the speaker 209, respectively, as with the picture signal and the audio signal which have been demodulated by the tuner 201.

The LAN interface 211 obtains a WEB content and a VOD content from a WEB server and a VOD server, respectively. These network contents are decoded by software in the control section 220. A picture signal and an audio signal, which represent the network contents decoded by the control section 220, are broadcasted to the picture processing section 203 and the audio processing section 207, respectively, and are then outputted by the LCD 205 and the speaker 209, respectively, as with the picture signal and the audio signal which have been demodulated by the tuner 201.

In addition to the above described functions, the control section 220 has a function to generate a picture signal which represents the menu screen 100 illustrated in FIG. 1. The picture signal which has been generated by the control section 220 and represents the menu screen 100 is broadcasted to the picture processing section 203, and is then outputted by the LCD 205 as with the picture signal demodulated by the tuner 201. Note that the control section 220 obtains, from a manufacturer server via the LAN interface 211, various kinds of information which are necessary for generating the picture signal representing the menu screen 100.

The control section 220 includes a CPU, a ROM, a RAM, and the like, and the CPU executes programs stored in the ROM, the RAM, and the like so as to achieve the above described functions. Moreover, the control section 220 is substantially identical with the control section 10 illustrated in FIG. 4, and comprehensively controls functions of the television 1.

The tuner 201 is a double tuner which can receive terrestrial digital broadcastings from at least two stations, as with the tuner section 21a and the tuner section 21b illustrated in FIG. 4.

[Effect Brought about by Television]

The television 1 quickly obtains a thumbnail 5a which is presumed to greatly influence usability, and it is therefore possible to solve the first problem. Moreover, the time required to obtain the thumbnail 5a is shortened, and therefore the thumbnail is easily kept in a latest state. From this, the television 1 can solve the second problem.

Therefore, the television 1 of the present embodiment can improve user-friendliness.

[Combination of Configurations (Technical Means) of Embodiments]

Note that the configurations of the embodiments above described can be combined as appropriate. That is, an embodiment derived from a combination of all or part of configurations described in the above embodiments is also encompassed within the technical range of the present invention.

[Example of Configuration Achieved by Software]

Lastly, each block of the television 1 can be configured by hardware with the use of a logic circuit formed on an integrated circuit (IC chip) or by software with the use of CPU (Central Processing Unit).

In the case of being configured by software, the television 1 includes a CPU and a storage device (storage medium) such as a ROM (Read Only Memory), a RAM (Random Access Memory), and a memory. The CPU executes instructions of programs for realizing the functions. In the ROM, the programs are stored. Into the RAM, the programs are loaded. In the memory, the programs and various data are stored. The objective of the present invention can also be achieved, by (i) supplying a storage medium, in which program codes (executable programs, intermediate code programs, source programs) of programs for controlling television 1 configured by software for realizing the functions, are stored so that a computer can read them, to television 1, and then (ii) causing the computer (or CPU or MPU) to read and execute the program codes stored in the storage medium.

The storage medium can be a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; a semiconductor memory such as a mask ROM, EPROM, EEPROM (Registered Trademark), or flash ROM; or a logic circuit such as PLD (Programmable Logic Device) or FPGA (Field Programmable Gate Array).

Alternatively, television 1 can be arranged to be connectable to a communications network so that the program codes are delivered over the communications network. The communications network is not limited to a specific one, provided that the program codes can be transferred via the communications network. The communications network can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific configuration or a specific type, provided that the program codes can be transferred via the transfer medium. The transfer medium can be, for example, wired line such as IEEE 1394, USB, electric power line, cable TV line, telephone line, or ADSL (Asymmetric Digital Subscriber Line) line; or wireless such as infrared radiation (IrDA, remote control), Bluetooth (Registered Trademark), IEEE 802.11 wireless, HDR (High Data Rate), NFC (Near Field Communication), DLNA (Digital Living Network Alliance), mobile telephone network, satellite line, or terrestrial digital network. Note that, the present invention can be realized by a computer data signal (i) which is realized by electronic transmission of the program code and (ii) which is embedded in a carrier wave.

As above described in this specification, the term "means" does not necessarily indicates a physical means. Therefore, functions of the means may be realized by software. Further, a function of one of the means may be realized by two or more physical means. Alternatively, functions of two or more of the means may be realized by one (1) physical means.

[Main Points]

The display device (television receiver 1) in accordance with an aspect 1 of the present invention includes:

(1) first receiving means (tuner section 21*a*) for receiving a broadcast wave (broadcast wave 2*a*) broadcasted from an external broadcasting station, the display device list-displaying a content (television program 3*a*) which has been carried by the broadcast wave received by the first receiving means;

(2) second receiving means (tuner section 21*b*) for preferentially receiving first broadcast waves (broadcast wave 2*b*) for carrying first contents (television program 3*b*), which are list-displayed near the content carried by the broadcast wave, rather than second broadcast waves for carrying second contents which are list-displayed away from the content carried by the broadcast wave; and (3) obtaining means (information obtaining section 11) for obtaining, from the first broadcast waves received by the second receiving means, images (thumbnail 5*a*) which represent the respective first contents.

The method for controlling the display device in accordance with the aspect 1 of the present invention includes the steps of:

(1) receiving a broadcast wave broadcasted from an external broadcasting station, the display device list-displaying a content which has been carried by the broadcast wave;

(2) preferentially receiving first broadcast waves for carrying first contents, which are list-displayed near the content carried by the broadcast wave, rather than second broadcast waves for carrying second contents which are list-displayed away from the content carried by the broadcast wave (S11, S18); and (3) obtaining, from the first broadcast waves received in the step (2), images which represent the respective first contents (S13, S20).

As early described, it takes time to obtain an image representing a content from a broadcast wave (first problem). Therefore, according to a simple method in which images are obtained sequentially from all receivable broadcasting stations, for example, it takes long time from when an instruction is given by the user on displaying a contents listing (e.g., counterprogram listing) to when the contents listing including the images is displayed.

Moreover, when it takes long time to obtain an image, it becomes difficult to synchronize the image with the content (second problem). Therefore, for example, even in a case where the user causes a contents listing to be displayed, an inconvenience may occur in which the user cannot view an appropriate list of contents that are currently broadcasted.

According to the configurations (1) through (3), the display device in accordance with the aspect 1 of the present invention and the method for controlling the device preferentially receive first broadcast waves for carrying first contents, which are list-displayed near the content currently viewed by the user, rather than second broadcast waves for carrying second contents which are list-displayed away from the content carried by the broadcast wave. Further, the display device and the like obtain, from the first broadcast waves, images which represent the respective first contents.

For example, in a case where the display device such as a television receiver displays a list of contents by displaying a contents listing (e.g., counterprogram listing), it is highly probable that images of contents, which are list-displayed near the content which the user is viewing, are first required. This is because the contents listing generally list-displays the contents such that the content, which the user is viewing, can be first selected.

Under the circumstances, the display device and the like preferentially obtain, with the highest necessity, images of contents list-displayed near the content which the user is viewing. This allows the display device and the like to quickly obtain the images which are presumed to greatly influence usability, and it is therefore possible to solve the first problem. Moreover, by thus shortening the time required to obtain the image, the image can be easily kept in its latest state, and the display device and the like can therefore solve the second problem.

Therefore, the display device in accordance with the aspect 1 of the present invention and the method for controlling the device can improve user-friendliness.

According to the display device in accordance with an aspect 2 of the present invention, in the aspect 1, (1) in a case where a broadcasting station has been selected by a user operation, the second receiving means can preferentially receive first broadcast waves for carrying first contents, which are list-displayed near a content carried by a broadcast wave broadcasted by the broadcasting station thus selected, rather than second broadcast waves for carrying second contents which are list-displayed away from the content carried by the broadcast wave broadcasted by the broadcasting station thus selected.

According to the configuration (1), in a case where a broadcasting station has been selected by a user operation, the display device preferentially receives first broadcast waves for carrying first contents, which are list-displayed near a content carried by a broadcast wave broadcasted by the broadcasting station thus selected, rather than second broadcast waves for carrying second contents which are list-displayed away from the content carried by the broadcast wave broadcasted by the broadcasting station thus selected.

A case is probable in which, while retaining a broadcasting station which is broadcasting the content being viewed by the user, the user selects another broadcasting station via a predetermined user interface. Even in such a case, the display device can preferentially obtain, following the selection, images which are presumed to greatly influence usability.

Therefore, the display device in accordance with the aspect 2 of the present invention can further improve user-friendliness.

The display device in accordance with an aspect 3 of the present invention, in the aspect 1 or the aspect 2, can further include:

(1) display means (information display section 12) for displaying images, which have been obtained by the obtaining means, in accordance with a predetermined form in which the broadcasting station for broadcasting the broadcast wave received by the first receiving means or the broadcasting station selected by the user operation is first selectable.

According to the configuration (1), the display device displays obtained images in accordance with the predetermined form in which the broadcasting station, which broadcasts the broadcast wave for carrying the content being viewed by the user, or the broadcasting station selected by the user operation can be selected first.

That is, the display device displays images in accordance with a list form in which receivable broadcasting stations are aligned in one line in a predetermined order, while, for example, a cursor is on the broadcasting station (i.e., the broadcasting station is first selectable) which is broadcasting the television program that is being viewed by the user.

Therefore, the display device in accordance with the aspect 3 of the present invention can first display the image which has been quickly obtained, and this makes it possible to further improve user-friendliness.

According to the display device in accordance with an aspect 4 of the present invention, in the aspect 3, (1) the obtaining means further obtains content identification information (program information 5b), with which a content is identified, from at least one of the broadcast wave received by the first receiving means and the first broadcast wave received by the second receiving means; and (2) the display means further displays the content identification information obtained by the obtaining means.

According to the configurations (1) and (2), the display device obtains not only the image but also the content identification information, with which the content is identified, from the broadcast wave. Further, the display device displays the obtained content identification information. Therefore, the display device in accordance with the aspect 4 of the present invention can further improve user-friendliness.

The display device in accordance with an aspect 5 of the present invention, in the aspect 3 or the aspect 4, can further include:

(1) judging means (conformity judging section 13) for judging whether or not the image obtained by the obtaining means conforms to the first content carried by the first broadcast wave received by the second receiving means; and (2) in a case where the judging means determines that the image does not conform to the first content, the display means does not need to display the image thus determined.

According to the configurations (1) and (2), the display device judges whether or not the image obtained from the broadcast wave conforms to the content carried by the broadcast wave, and in a case where the display device determines that the image does not conform to the content, the display device does not display the image.

That is, in a case where the broadcasting of the content is ended after the display device obtained the image and then broadcasting of another program is started, it is probable that the content represented by the obtained image does not conform to a content whose broadcasting has been newly started.

The display device judges conformity/inconformity between the image and the content, and does not display the image in a case where the inconformity is determined. This makes it possible to avoid the inconvenience above described. Therefore, the display device in accordance with the aspect 5 of the present invention can further improve user-friendliness.

According to the display device in accordance with an aspect 6 of the present invention, in any one of the aspects 3 through 5, (1) the obtaining means further obtains limit information which indicates whether or not to permit viewing the first content; and, in a case where the limit information indicates that it is not permitted to view the first content, the obtaining means does not need to obtain the image of the first content.

According to the configuration (1), the display device can obtain information, which indicates that the viewing of the content is limited, such as information relating to a viewing contract on the content, information indicative of whether or not being scrambled, information on viewable age limit, or information relating to defective reception.

In a case where it is determined, based on the limit information, that access to the content is limited, the display device does not obtain the image. From this, the display device in accordance with the aspect 6 of the present invention can omit an unnecessary process in advance.

According to the display device in accordance with an aspect 7 of the present invention, it is possible in any one of the aspects 3 through 6 that:

(1) the obtaining means further obtains limit information which indicates whether or not to permit viewing the first content, and in a case where the limit information indicates that it is not permitted to view the first content, the obtaining means obtains information indicating a reason for unable to view, instead of the image of the first content; and (2) the display means displays, in accordance with a predetermined form, the information indicating the reason and the content identification information which have been obtained by the obtaining means.

According to the configurations (1) and (2), in a case where it can be determined, based on the limit information, that access to the content is limited, the display device obtains information relating to a reason for limiting the access, instead of obtaining the image. Therefore, the display device in accordance with the aspect 7 of the present invention can present, to the user, the reason for limiting the access.

According to the display device in accordance with an aspect 8 of the present invention, it is possible in the aspect 6 or 7 that:

(1) in a case where it is detected that a setting of the limit information has been changed to permit viewing the first content, the obtaining means obtains an image, which represents the first content, from the first broadcast wave received by the second receiving means.

According to the configuration (1), in a case where the setting of the limit information has been changed, the display device can immediately and surely reflect the change, and it is therefore possible to further improve user-friendliness.

According to the display device in accordance with an aspect 9 of the present invention, it is possible in any one of the aspects 6 through 8 that:

(1) in a case where it is detected that a setting of the limit information has been changed, the obtaining means (i) deletes the image which has been obtained and represents the first content and then (ii) obtains again an image representing the first content from the first broadcast wave received by the second receiving means.

According to the configuration (1), in a case where the setting of the limit information has been changed, the display device can immediately and surely reflect the change, and it is therefore possible to further improve user-friendliness.

The television receiver in accordance with an aspect 10 of the present invention can include:

(1) the display device in accordance with any one of the aspects 1 through 9.

Therefore, the television receiver of the present invention brings about an effect similar to that of the display device.

Note that the display device can be realized by a computer. In such a case, the present invention encompasses (i) a control program which causes the computer to serve as each of the means of the display device and (ii) a computer-readable storage medium in which the control program is stored.

INDUSTRIAL APPLICABILITY

The present invention is applicable to a television receiver. Moreover, the present invention can be widely applied to, for example, electronic apparatuses such as a personal computer, a tablet-type information terminal, and a smart phone which can display a content carried by a broadcast wave broadcasted by an external broadcasting station.

REFERENCE SIGNS LIST

1: Television receiver (display device, television receiver)
2a: Broadcast wave (broadcast wave)
2b: Broadcast wave (first broadcast wave)
3a: Television program (content)
5a: Thumbnail (image)
5b: Program information (content identification information)
6a: Limit information (limit information)
11: Information obtaining section (obtaining means)
12: Information display section (display means)
13: Conformity judging section (judging means)
21a: Tuner section (first receiving means)
21b: Tuner section (second receiving means)

The invention claimed is:

1. A display device comprising:
a first receiving section configured to receive a content which is being viewed by a user, said display device list-displaying a plurality of images respectively representing a plurality of contents, the plurality of images being displayed at positions different from a position where the content which is being viewed by the user is displayed, and the plurality of images not overlapping with the content which is being viewed by the user;
a second receiving section configured to preferentially receive first contents respectively represented by first images rather than second contents respectively represented by second images, the first contents being ones of the plurality of contents, the first images being ones of the plurality of images and displayed near an image representing the content which is being viewed by the user, the second contents being ones of the plurality of contents, and the second images being ones of the plurality of images and displayed away from the image representing the content which is being viewed by the user;
an obtaining section configured to obtain the first images which respectively represent the first contents received by the second receiving section; and
a display section configured to display the first images obtained by the obtaining section.

2. The display device as set forth in claim 1, wherein:
in a case where one of the plurality of contents has been selected by a user operation, the second receiving section preferentially receives first contents rather than second contents, the first contents being displayed near the one of the plurality of contents which has been selected, and the second contents being displayed away from the one of the plurality of contents which has been selected.

3. The display device as set fort in claim 1, wherein:
the display section displays, which have been obtained by the obtaining section, in accordance with a predetermined form in which the content received by the first receiving section or one of the plurality of contents which has been selected by a user operation is first selectable.

4. The display device as set forth in claim 3, wherein:
the obtaining section further obtains content identification information, with which a content is identified, from at least one of the content received by the first receiving section and the first contents received by the second receiving section; and
the display section further displays the content identification information obtained by the obtaining section.

5. The display device as set forth in claim 4, wherein:
the obtaining section further obtains limit information which indicates whether or not to permit viewing said one of the first contents;
in a case where the limit information indicates that it is not permitted to view said one of the first contents, the obtaining section obtains information indicating a reason for unableness to view, instead of the first image representing said one of the first contents; and
the display section displays, in accordance with a predetermined form, the information indicating the reason for unableness to view and the content identification information which have been obtained by the obtaining section.

6. The display device as set forth in claim 3, further comprising:
a judging section configured to judge whether or not the first image obtained by the obtaining section conforms to a first image representing one of the first contents received by the second receiving section,
in a case where the judging section determines that the first image obtained by the obtaining section does not conform to the first image representing one of the first contexts, the display section not displaying the first image thus determined.

7. The display device as set forth in claim 3, wherein:
the obtaining section further obtains limit information which indicates whether or not to permit viewing one of the first contents; and
in a case where the limit information indicates that it is not permitted to view said one of the first contents, the obtaining section does not obtain a first image representing said one of the first contents.

8. The display device as set forth in claim 5, wherein:
in a case where it is detected that a setting of the limit information has been changed to permit viewing said one of the first contents, the obtaining section obtains the first image representing said one of the first contents.

9. The display device as set forth in claim 5, wherein:
in a case where it is detected that a setting of the limit information has been changed, the obtaining section (i) deletes the first image which has been obtained and represents said one of the first contents and then (ii) obtains again a first image representing said one of the first contents.

10. A television receiver comprising a display device recited in claim 1.

11. A non-transitory computer-readable storage medium storing a control program for causing a computer to operate as a display device recited in claim 1, the control program causing the computer to serve as each of the sections of the display device.

12. The display device as set forth in claim 1, further comprising:
a judging section configured to determine whether or not an image obtained by the obtaining section conforms to a corresponding one of the first contents received by the second receiving section, the display section displaying or not displaying the image based on the determination made by the judging section.

13. A method for controlling a display device, said method comprising the steps of:
(a) receiving a content which is being viewed by a user, the display device list-displaying a plurality of images respectively representing a plurality of contents, the plurality of images being displayed at positions different from a position where the content which is being viewed by the user is displayed, and the plurality of images not overlapping with the content which is being viewed by the user;
(b) preferentially receiving first contents respectively represented by first images rather than second contents respectively represented by second images, the first contents being ones of the plurality of contents, the first images being ones of the plurality of images and displayed near an image representing the content which is being viewed by the user, the second contents being ones of the plurality of contents, and the second images being ones of the plurality of images and displayed away from the image representing the content which is being viewed by the user;
(c) obtaining the first images which respectively represent the first contents received in the step (b); and
(d) displaying the first images obtained in the step (c).

* * * * *